(12) United States Patent
Limberg et al.

(10) Patent No.: US 7,038,732 B1
(45) Date of Patent: May 2, 2006

(54) DTV SIGNAL WITH GCR COMPONENTS IN PLURAL-DATA-SEGMENT FRAME HEADERS AND RECEIVER APPARATUS FOR SUCH SIGNAL

(75) Inventors: Allen L. Limberg, Vienna, VA (US); Chandrakant B. Patel, Hopewell, NJ (US)

(73) Assignee: Samsung Electronics Company, Ltd., (KR)

(*) Notice: Subject to any disclaimer, the term of this patent is extended or adjusted under 35 U.S.C. 154(b) by 0 days.

(21) Appl. No.: 09/700,448

(22) PCT Filed: May 11, 1999

(86) PCT No.: PCT/US99/10290

§ 371 (c)(1),
(2), (4) Date: Feb. 20, 2001

(87) PCT Pub. No.: WO99/59331

PCT Pub. Date: Nov. 18, 1999

Related U.S. Application Data

(60) Provisional application No. 60/085,064, filed on May 12, 1998, provisional application No. 60/089,882, filed on Jun. 19, 1998, provisional application No. 60/103,470, filed on Oct. 8, 1998, provisional application No. 60/120,638, filed on Feb. 18, 1999.

(51) Int. Cl.
*H04N 7/24* (2006.01)

(52) U.S. Cl. .................................................... 348/614

(58) Field of Classification Search ................ 348/614, 348/611, 607, 610, 608, 470, 432, 495, 471, 348/472, 21; 375/348, 346, 350, 231, 233, 375/262

See application file for complete search history.

(56) References Cited

U.S. PATENT DOCUMENTS

| | | | |
|---|---|---|---|
| 4,864,403 A * | 9/1989 | Chao et al. ................. | 348/614 |
| 5,196,936 A * | 3/1993 | Kobayashi et al. ......... | 348/614 |
| 5,600,380 A * | 2/1997 | Patel et al. ................. | 348/614 |
| 5,619,269 A * | 4/1997 | Lee et al. .............. | 375/240.01 |
| 5,623,318 A * | 4/1997 | Lee ........................... | 348/614 |
| 5,623,319 A * | 4/1997 | Hill et al. ................... | 348/614 |
| 5,796,441 A * | 8/1998 | Oshita ........................ | 348/476 |
| 6,011,814 A * | 1/2000 | Martinez et al. ............ | 375/233 |
| 6,057,877 A * | 5/2000 | Limberg ...................... | 348/21 |
| 6,184,938 B1 * | 2/2001 | Patel et al. ................. | 348/614 |
| 6,300,984 B1 * | 10/2001 | Limberg et al. ............ | 348/614 |
| 6,380,984 B1 * | 4/2002 | Inoue et al. ................ | 348/569 |
| 6,816,204 B1 * | 11/2004 | Limberg ..................... | 348/614 |

* cited by examiner

*Primary Examiner*—Paulos M. Natnael
(74) *Attorney, Agent, or Firm*—Howrey LLP

(57) ABSTRACT

A DTV signal has a plural-data-segment frame header including complementary first and second ghost-cancellation reference signals differentially delayed by the duration of two NTSC horizontal scan lines. A receiver for such DTV signal has an adaptive equalizer for baseband symbol code with kernel weights calculated by a computer operative on the equalizer response after comb filtering. The comb filter combines the equalizer response as differentially delayed by the duration of two NTSC horizontal scan lines to cancel artifacts of co-channel NTSC interference in the comb filtered equalizer response supplied to the computer. This reduces the undesirable influence of such artifacts on equalization to reduce intersymbol interference.

54 Claims, 12 Drawing Sheets

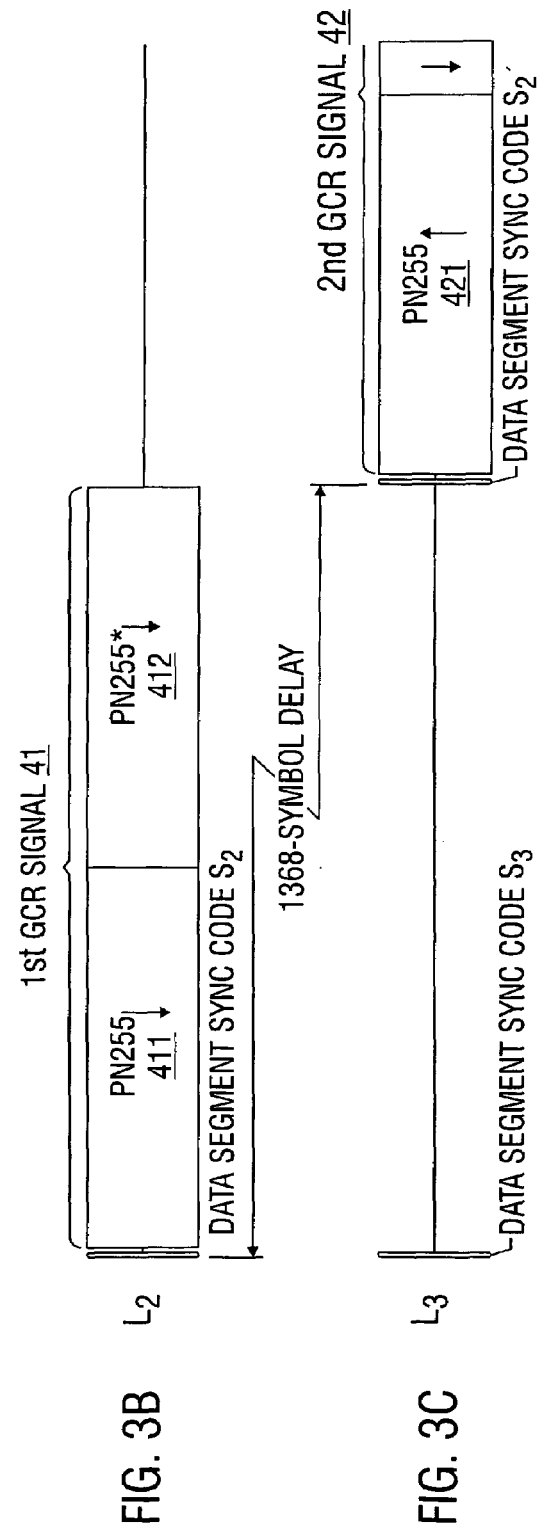

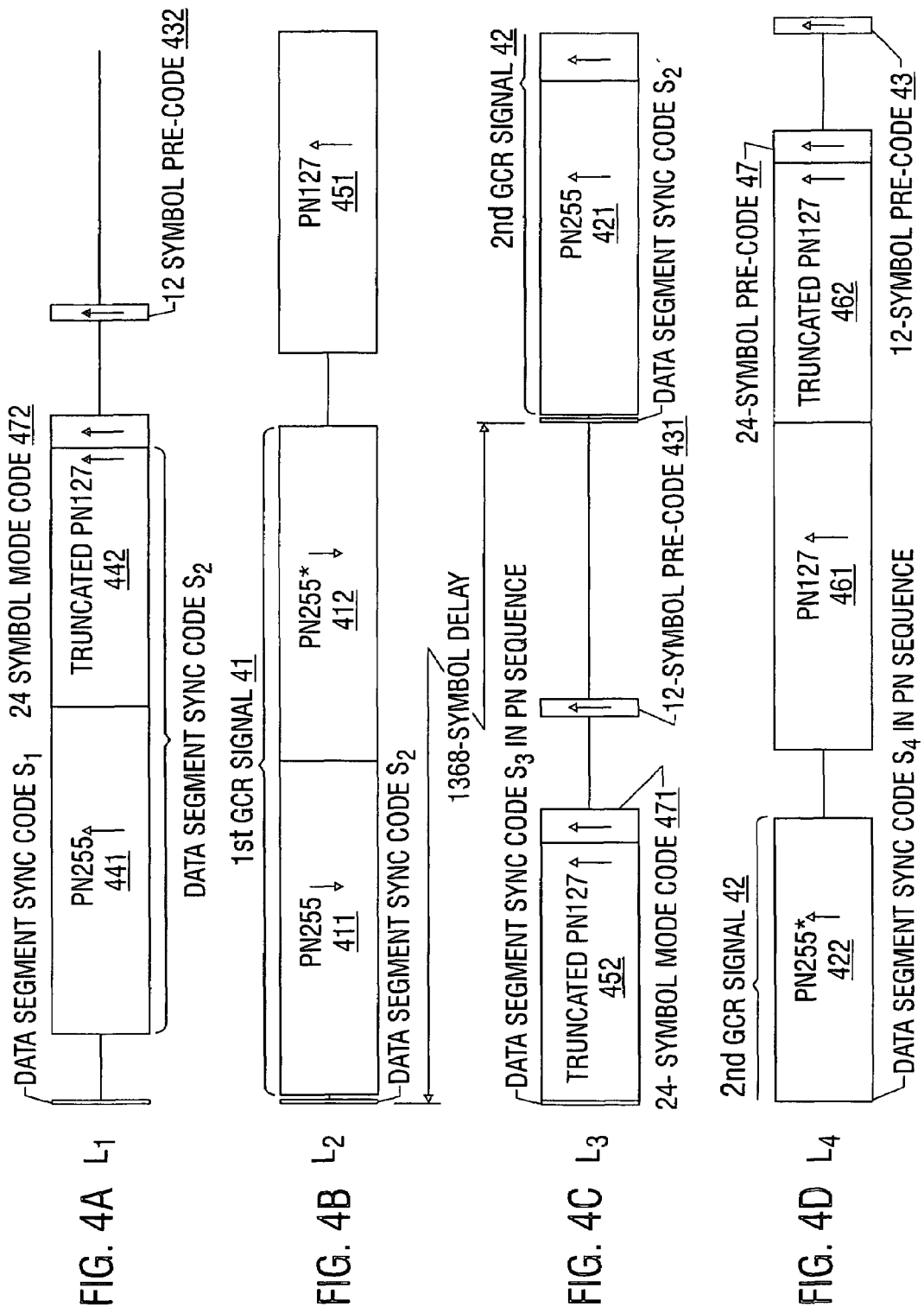

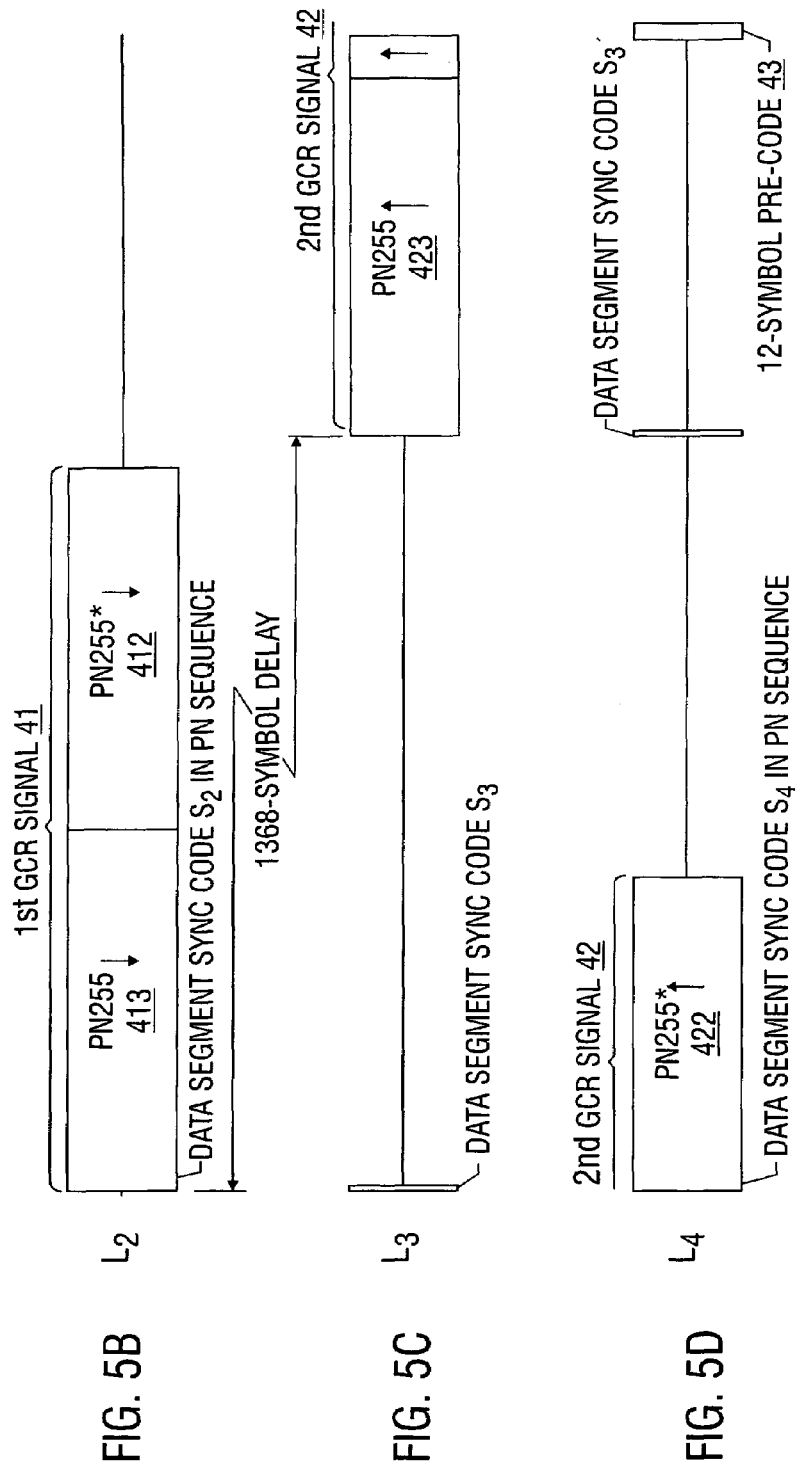

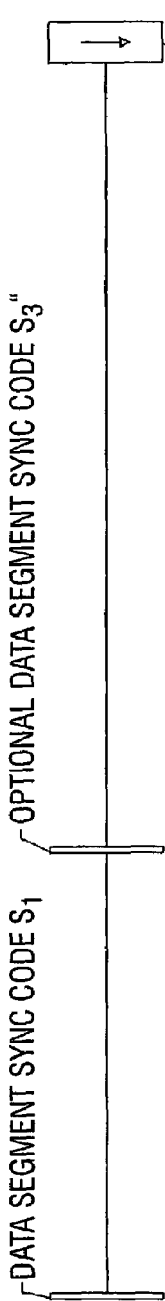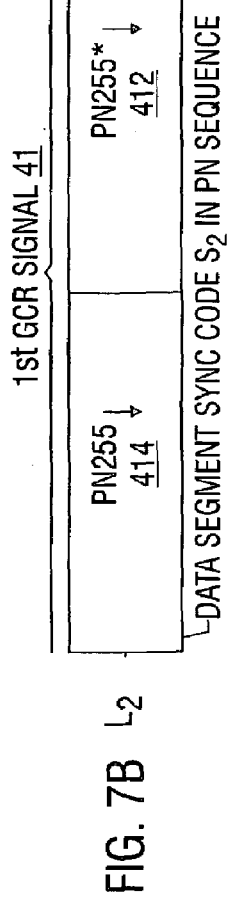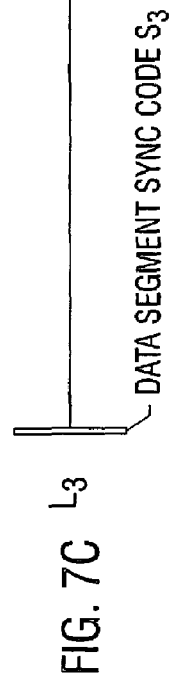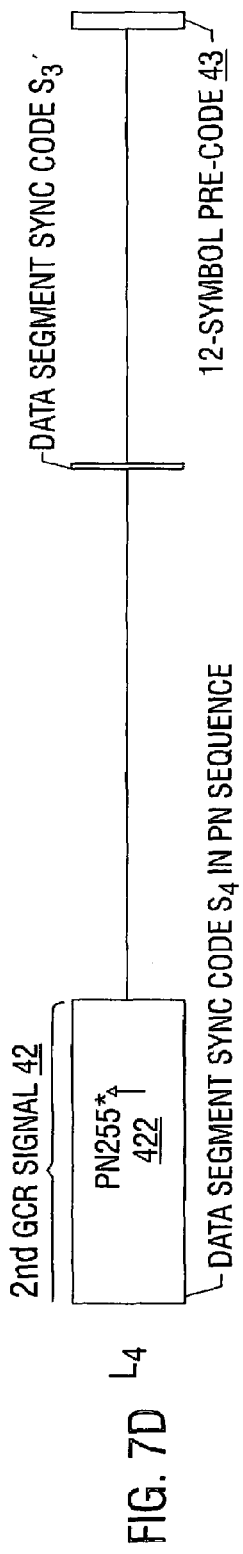

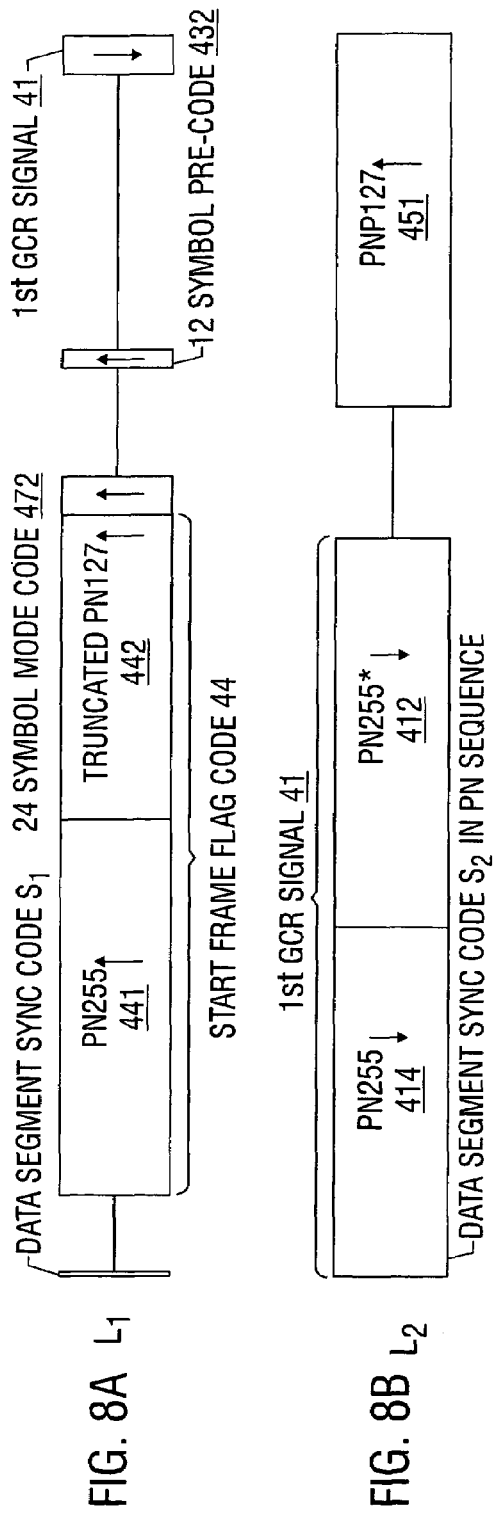
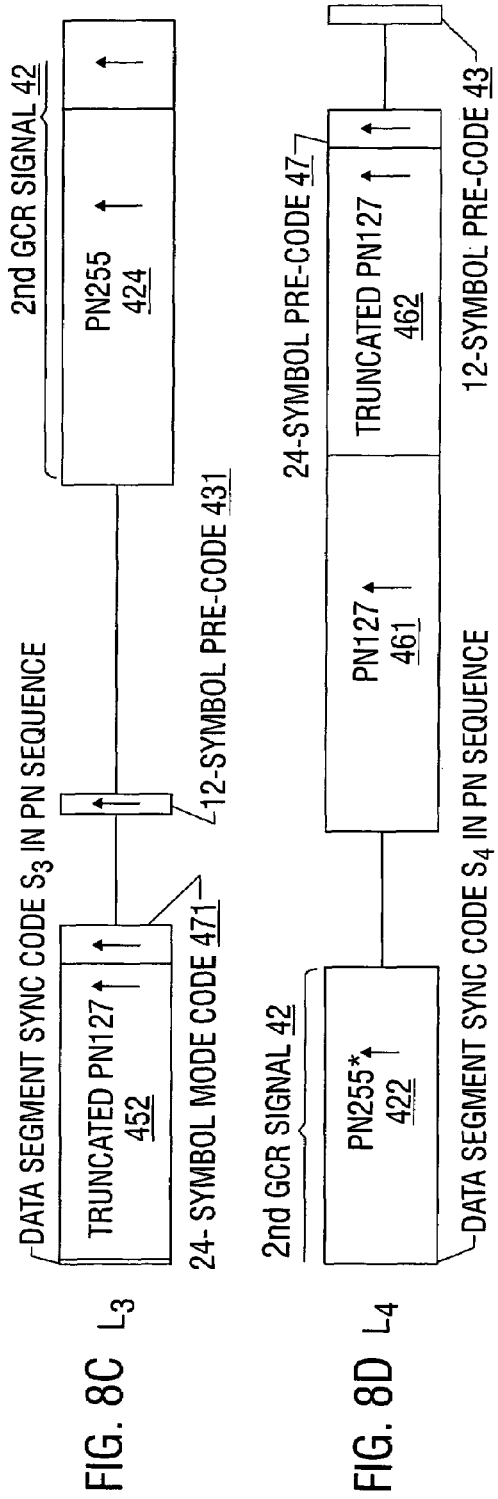

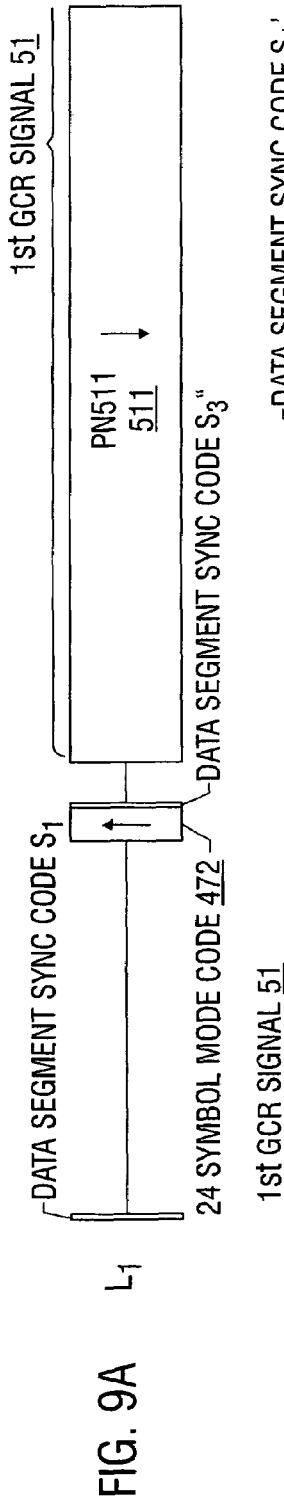
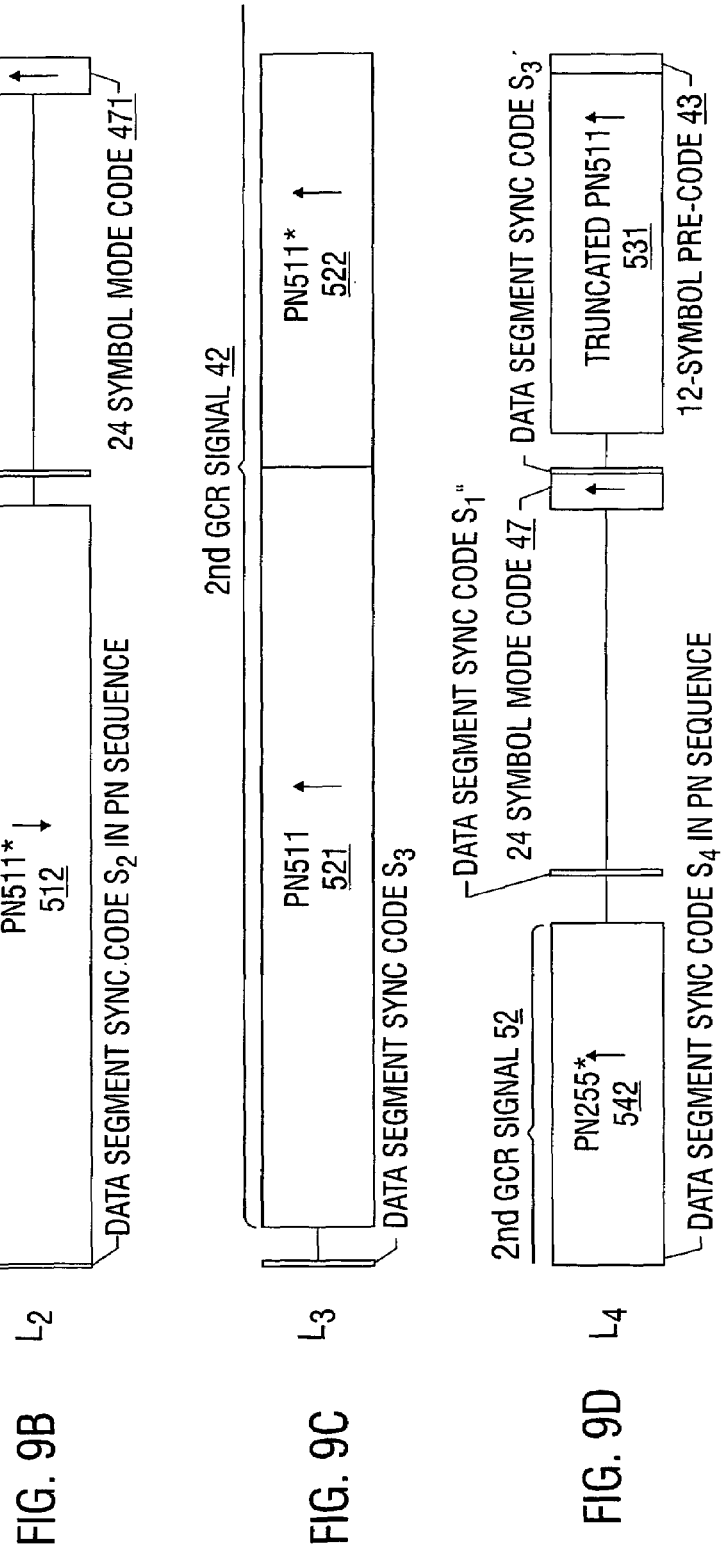
FIG. 9A
FIG. 9B
FIG. 9C
FIG. 9D

DTV SIGNAL WITH GCR COMPONENTS IN PLURAL-DATA-SEGMENT FRAME HEADERS AND RECEIVER APPARATUS FOR SUCH SIGNAL

This application is a 371 of PCT/US99/10290 filed May 11, 1999, which claims benefit of Ser. No. 60/085,064 filed May 12, 1998, which claims benefit of Ser. No. 60/089,882 filed Jun. 19, 1998, which claims benefit of Ser. No. 60/103,470 filed Oct. 8, 1998, which claims benefit of Ser. No. 60/120,638 filed Feb. 18, 1999.

The invention relates to ghost-cancellation circuitry in television receivers and to reference signals included in transmitted television signals for facilitating such ghost-cancellation.

BACKGROUND OF THE INVENTION

Distortion in the baseband signals recovered by a receiver caused by multi-path reception is a problem in digital television (DTV) transmissions as well as in NTSC analog television transmissions, although the distortion is not seen as ghost images by the viewer of the image televised by DTV. Rather the distortion causes errors in the data-slicing procedures used to convert symbol coding to binary code groups. If these errors are too frequent in nature, the error correction capabilities of the DTV receiver are overwhelmed, and there is catastrophic failure in the television image. If such catastrophic failure occurs infrequently, it can be masked to some extent by freezing the good TV images most recently transmitted, such masking being less satisfactory if the TV images contain considerable motion content. DTV receivers use adaptive equalizers to suppress the distortion caused by multipath reception, which equalizers are similar to those previously used in some NTSC television receivers. The adaptive equalizers are digital filters with kernel weights that can be adjusted by suitable electronics to reduce multi-path signals known as "pre-ghosts" that are received before the principal signal is received and to reduce multi-path signals known as "post-ghosts" that are received after the principal signal is received.

Several forms of adaptive equalizer are known. The adaptive equalizer can be a finite-impulse-response (FIR) digital filter formed from a several-bit-wide digital shift register a few hundred stages in length and a respective 4-quadrant digital multiplier for each stage to weight the contents of that stage by respective kernel weight for inclusion in a weighted summation. However, since many of the kernel weights are of negligible value, such a straightforward approach is wasteful of digital hardware. Adaptive equalizers currently preferred by many persons skilled in the art incorporate cascades of digital filters with specialized functions, such as the cancellation of pre-ghosts occurring a substantial number of microseconds before the principal signal, the cancellation of post-ghosts occurring a substantial number of microseconds after the principal signal, and the cancellation of so-called "micro-ghosts" that occur close in time to the principal signal but affect the amplitude and phase characteristics of the principal signal in undesired degree. The two types of digital filter earlier referred to are sometimes referred to as "ghost cancellation filters" in contradistinction to the last of these types of digital filter with specialized function being sometimes referred to as an "equalizer", but in this specification the term "equalizer" is used in a generic sense to include all these species of digital filter.

A standard for digital high-definition television (HDTV) signals published 16 Sep. 1995 by the Advanced Television Systems Committee (ATSC) is currently accepted as the de facto standard for terrestrial broadcasting of digital television (DTV) signals in the United States of America. The data is transmitted in a succession of consecutive-in-time data fields each containing 313 consecutive-in-time data segments or data lines. The data is randomized and interleaved with a 52-data-segment (inter-segment) convolutional byte interleaver during its arrangement into the data fields. Each segment of data is preceded by a data segment synchronization code group of four symbols having successive values of +S, −S, −S and +S. The value +S is one level below the maximum positive data excursion, and the value −S is one level above the maximum negative data excursion. The segments of data are each of 77.3 microsecond duration, and there are 832 symbols per data segment for a symbol rate of about 10.76 MHz. The initial line of each data field is a data field synchronization (DFS) code group that codes a training signal for channel-equalization and multipath suppression procedures. The remaining lines of each data field contain data that have been Reed-Solomon forward error-correction coded. In over-the-air broadcasting the error-correction coded data are then trellis coded using twelve interleaved trellis codes, each a 2/3 rate punctured trellis code with one uncoded bit. Trellis coding results are parsed into three-bit groups for over-the-air transmission in eight-level one-dimensional-constellation symbol coding, which transmission is made without symbol pre-coding separate from the trellis coding procedure. Trellis coding is not used in cable-casting proposed in the ATSC standard. The error-correction coded data are parsed into four-bit groups for transmission as sixteen-level one-dimensional-constellation symbol coding, which transmissions are made without precoding.

The carrier frequency of a VSB DTV signal is 310 kHz above the lower limit frequency of the TV channel. The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized value of 1.25. The normalized value of +S is +5, and the normalized value of −S is −5.

In the ATSC standard published 16 Sep. 1995 the data field synchronization signals in initial data segments of consecutive data fields were designed for use as ghost-cancellation reference (GCR) signals to train adaptive equalization circuitry in the DTV signal receiver. The training signal or GCR signal in the initial data segment of each data field is a 511-sample pseudo-random noise sequence referred to as "PN511 signal" followed by three 63-sample pseudo-random noise sequences referred to as "PN63 signals". The middle ones of the PN63 signals in the field synchronization codes are transmitted in accordance with a first logic convention in the first of 313 data segments in each odd-numbered data field and in accordance with a second logic convention in the first of 313 data segments in each even-numbered data-field, the first and second logic conventions being one's complementary respective to each other. The other two PN 63 signals and the PN511 signal are transmitted in accordance with the first logic convention in each and every data field.

The middle PN63 sequence of the ATSC field synchronization code, as separated by differentially combining corresponding samples of successive field synchronization code sequences, can used as a basis for detecting ghosts. Pre-ghosts of up to −47.848 microseconds (578 symbol periods) before the separated middle PN63 sequence can be detected in a discrete Fourier transform (DFT) procedure without having to discriminate against data in the last data segment of the preceding data field. However, the post-ghosts of such data can extend up to forty microseconds into the first data segments and add to the background clutter that has to be discriminated against when detecting pre-ghosts of the separated middle PN63 sequence. Post-ghosts of up to 18.117 microseconds (195 symbol periods) after the separated middle PN63 sequence can be detected in a DFT procedure without having to discriminate against data in the precode and in the data segment of the succeeding data field. Longer-delayed post-ghosts have to be detected while discriminating against background clutter that includes data. The auto-correlation properties of the PN63 sequence are not so great that detection of longer-delayed post-ghosts is sufficiently sensitive, it appears in practice. The middle PN63 sequence of the ATSC field synchronization code provides more pre-ghost canceling capability than required in practice, but insufficient post-ghost canceling capability. While post-ghosts delayed up to forty microseconds after principal signal occur in actual practice, pre-ghosts advanced more than six microseconds before principal signal do not occur except in a poorly shielded TV receiver where a signal may be received by direct radiation as much as thirty microseconds before the same signal received via cable. Pre-ghosts preceding the principal signal by more than four microseconds are rare, according to page 3 of the T3S5 Report Ghost Canceling Reference Signals published 20 Mar. 1992 by the ATSC.

Modifying the ATSC field synchronization code, so as to place the three PN63 sequences immediately after the 4-symbol segment synchronization code and an immediately pursuant 24-symbol VSB-mode code, to be followed by the PN511 sequence and the 104-symbol gap referred to as "reserve", would improve the ghost-separation capabilities of the separated middle PN63 sequence. Post-ghosts up to 63.364 microseconds (682 symbols duration) and pre-ghosts up to −8.455 microseconds (91 symbols duration) could be detected without data making substantial contribution to background clutter.

If one seeks to exploit the auto-correlation properties of the PN511 sequence in the ATSC DTV signal for selection of ghosts in a DFT procedure, the selection filter has to discriminate PN511 sequence and its ghosts from background clutter that includes data and the initial and final PN63 sequences. This background clutter has substantial energy, so weaker ghosts of the PN511 sequence are difficult to detect. The higher energy response of the PN511 auto-correlation filter used for ghost detection cannot be fully exploited because data and the initial and final PN63 sequences increase so much the energy of the background clutter that the filter is to discriminate against.

The training signal or GCR signal is used in many adaptive equalizers just for initializing the kernel weights, since initialization can be carried out more rapidly than is the case if adjustments of the kernel weights are made based on decisions as to the data content of currently received signal. Also, initialization using a training signal avoids the possibility of adjustments of the kernel weights stalling during least-mean-squares error calculations when a localized optimization of kernel weights is achieved that is not an ultimate optimization of those kernel weights. After initialization is accomplished, adjustments of the kernel weights are better made based on decisions as to the data content of currently received signal in a decision-directed adjustment procedure that can more rapidly adjust to changes in multi-path reception conditions, to permit tracking those changes sufficiently well that corruption of received signal is not so great as to cause frequent error in determining its data content. The need to acquire the training signal or GCR signal over the course of several data fields, in order to suppress ghosts of the principal signal sufficiently that decision-directed adjustment procedures can take over, presents a problem with ever being able initially to establish tracking of changing multi-path reception conditions.

This problem is avoided in accordance with an aspect of the invention by acquiring the GCR signal in a plurality of consecutive data segments within each data frame of the DTV signal. Acquiring GCR signal in consecutive horizontal trace intervals of an NTSC television signal is infeasible because: the information content of those lines is used to control quite directly the image traced onto the viewscreen during vertical trace period, there is no stable clock source (i.e., color burst) during the earlier horizontal trace intervals within vertical retrace period, and as a practical matter all but one of the later horizontal trace intervals within vertical retrace period is bespoken for other uses. These reasons are inapplicable to acquiring GCR signal in consecutive data segments of the DTV signal, or can be made so. There is no conformal mapping of the received data and the image traced on the viewscreen, so how GCR signal is inserted into the data stream is largely a matter of choice as long as data buffering requirements in the information pipeline do not become excessive. Measures can be provided for stabilizing the timing of sample clocks that are harmonically related to regenerated symbol clock during the consecutive data segments of the DTV signal in which the GCR signal is acquired. Since DTV is a new technology, there are no previous commercial considerations governing the use of particular data segments in the signal.

Another problem with the ghost suppression techniques previously attempted in DTV is that the effects of co-channel NTSC interference have not been given sufficient attention. The GCR signal received by a DTV signal receiver can be contaminated by artifacts of co-channel NTSC interference, particularly by standing frequencies associated with NTSC video carrier, chroma subcarrier and audio carrier. The adaptive equalizer will attempt to diminish response at those standing frequencies, which undesirably affects symbol decoding procedures. The artifacts of co-channel NTSC audio signal interference can be avoided by selective filtering in the intermediate-frequency amplifier of the DTV signal receiver, as described by A. L. R. Limberg in U.S. patent application Ser. No. 08/826,790 filed 24 Mar. 1997, entitled "DTV RECEIVER WITH FILTER IN I-F CIRCUITRY TO SUPPRESS FM SOUND CARRIER OF NTSC CO-CHANNEL INTERFERING SIGNAL", and incorporated herein by reference.

In accordance with an aspect of the invention received DTV baseband signal and that signal as delayed 1368 symbol epochs (the duration of two NTSC horizontal scan lines) are subtractively combined in a comb filter supplying a response from which training signal is to be extracted. The artifacts of co-channel NTSC video carrier and chroma subcarrier are eliminated in this comb filter response. The data segments of the DTV signal from which the GCR signal and its ghosts are to be acquired are designed each to include the GCR signal and its complement delayed 1368 symbol epochs (the duration of two NTSC horizontal scan lines) from the original GCR signal. Accordingly, this GCR signal is reproduced with doubled energy in the response of the comb filter used to suppress the artifacts of co-channel NTSC video carrier and chroma subcarrier.

SUMMARY OF THE INVENTION

An aspect of the invention concerns an electromagnetic wave signal comprising vestigial sideband modulation of a suppressed carrier in accordance with a baseband signal having a uniform symbol rate substantially 684 times the horizontal scan line rate of an NTSC television signal that is apt to accompany the electromagnetic wave signal as a co-channel interfering signal, the baseband signal being composed of consecutive data segments each consisting of a prescribed integral number of symbol epochs, and the consecutive data segments being divided into contiguous data frames each consisting of a prescribed integral number M of contiguous ones of those data segments. In an electromagnetic wave signal embodying this aspect of the invention, each data frame begins with a plurality N in number of data segments used as a frame header and concludes with a plurality (M-N) in number of data segments composed of consecutive multi-level symbols used for transmitting data. The frame header includes a first ghost-cancellation reference signal and a second ghost-cancellation reference signal at a prescribed time interval thereafter, which prescribed time interval is different than the duration of a data segment. The first and second ghost-cancellation reference signal exhibit respective variations which are of opposite sense to each other—i.e., which are complementary to each other. Preferably, the first ghost-cancellation reference signal comprises a plurality of PN sequences that are orthogonal to each other and contain an equal number of symbols. Preferably, the first ghost-cancellation reference signal begins substantially 1368 symbol epochs before the second ghost-cancellation reference signal. Other aspects of the invention concern baseband symbol coding corresponding to the electromagnetic wave signals embodying the aspects of invention previously described in this paragraph.

Still other aspects of the invention concern data signal receivers for the electromagnetic wave signals embodying the aspects of invention described in the foregoing paragraph. Such a data signal receiver includes circuitry for selecting one of these electromagnetic wave signals, converting the frequencies of the electromagnetic wave signal after its selection, and amplifying the electromagnetic wave signal after its selection and conversion in frequency. Such a data signal receiver includes circuitry for synchrodyning the electromagnetic wave signal to baseband after its selection, conversion in frequency and amplification and supplying digitized samples of a baseband signal resulting from synchrodyning the electromagnetic wave signal to baseband. These samples are supplied as input signal to an adaptive equalizer for supplying an equalizer response to those received samples as weighted by kernel weights that are electrically adjustable. Such a data signal receiver includes circuitry for regenerating transmitted data from the equalizer response. A comb filter is included in the data signal receiver for differentially delaying the equalizer response, so the first ghost-cancellation reference signal in the more delayed equalizer response occurs simultaneously with the second ghost-cancellation reference signal in the less delayed equalizer response, and for subtractively combining the more delayed equalizer response and the less delayed equalizer response to generate a comb filter response. A computer is arranged to respond to selected portions of the comb filter response including the result of subtractively combining the first and second ghost-cancellation reference signals, for performing initial electrical adjustments of the kernel weights of the adaptive equalizer whenever the data signal receiver is initially operated after a time of in operation or whenever the electromagnetic wave signal is initially selected.

Preferably, during continued operation of the data signal receiver, the computer electrically adjusts the kernel weights of the adaptive equalizer responsive to the comb filter response on a decision-directed basis. Alternatively, the computer may continue to update its adjustments of the kernel weights of the adaptive equalizer responsive to the comb filter response by continuing to use as a training signal those portions of the comb filter response including the result of subtractively combining the first and second ghost-cancellation reference signals.

BRIEF DESCRIPTION OF THE DRAWING

FIGS. 3A, 3B, 3C and 3D are timing diagrams showing the nature of the symbol coding in a data frame header consisting of the first four data segments $L_1$, $L_2$, $L_3$, and $L_4$ of each data frame of a vestigial-sideband digital television signal embodying aspects of the invention.

FIGS. 4A, 4B, 4C and 4D are timing diagrams showing the nature of the symbol coding in a data frame header consisting of the first four data segments $L_1$, $L_2$, $L_3$, and $L_4$ of each data frame of another VSB DTV signal embodying aspects of the invention.

FIGS. 5A, 5B, 5C and 5D are timing diagrams showing the nature of the symbol coding in a data frame header consisting of the first four data segments $L_1$, $L_2$, $L_3$, and $L_4$ of each data frame of another VSB DTV signal embodying aspects of the invention.

FIGS. 7A, 7B, 7C and 7D are timing diagrams showing the nature of the symbol coding in a data frame header consisting of the first four data segments $L_1$, $L_2$, $L_3$, and $L_4$ of each data frame of another VSB DTV signal embodying aspects of the invention.

FIGS. 8A, 8B, 8C and 8D are timing diagrams showing the nature of the symbol coding in a data frame header consisting of the first four data segments $L_1$, $L_2$, $L_3$, and $L_4$ of each data frame of another VSB DTV signal embodying aspects of the invention.

FIGS. 9A, 9B, 9C and 9D are timing diagrams showing the nature of the symbol coding in a data frame header consisting of the first four data segments $L_1$, $L_2$, $L_3$, and $L_4$ of each data frame of another VSB DTV signal embodying aspects of the invention.

DETAILED DESCRIPTION

Figure 1:
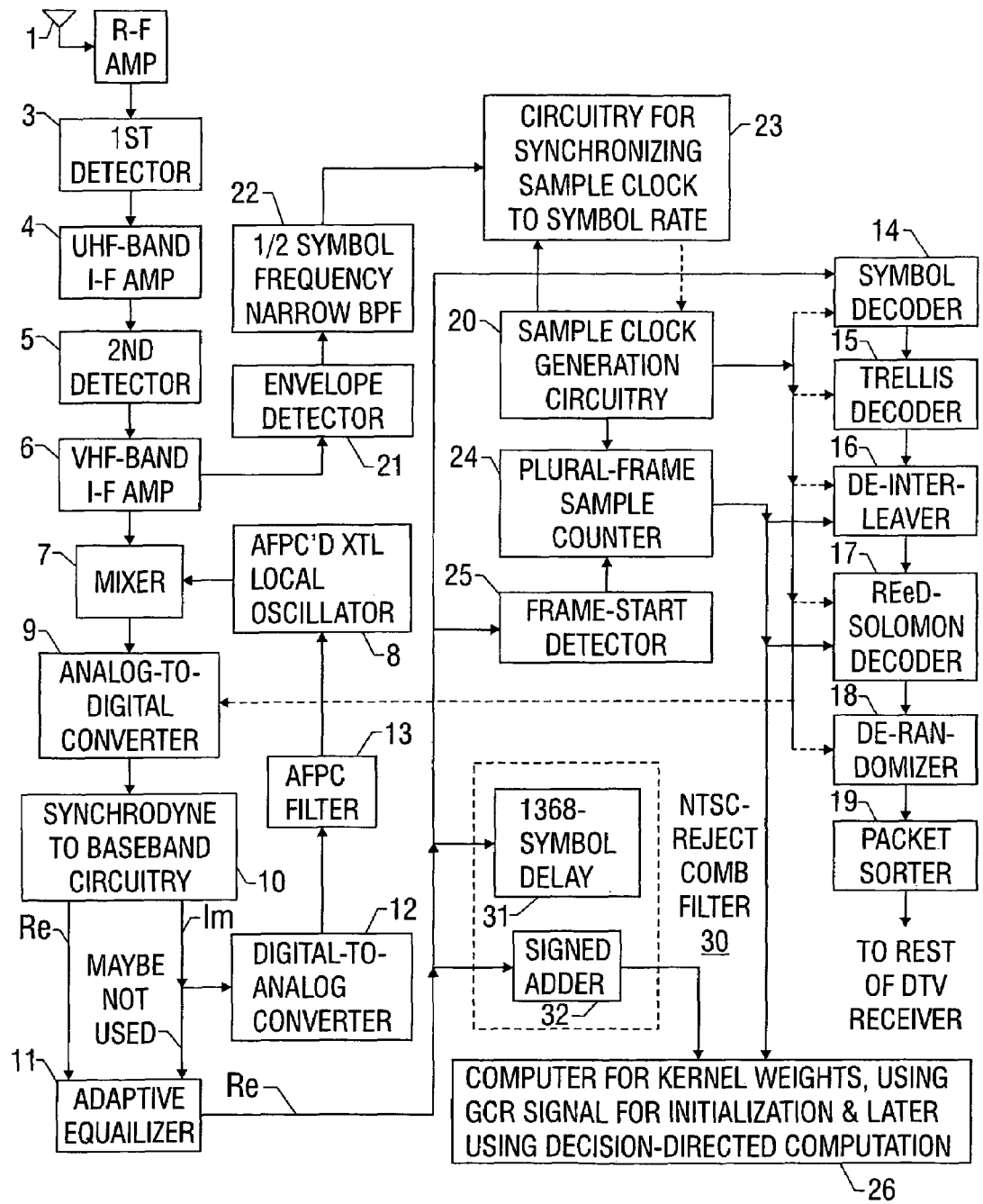
FIG. 1 is a block schematic diagram of a vestigial-sideband digital television signal receiver embodying the invention in one of its aspects.

In FIG. 1 antenna 1 represents all sources of radio-frequency (RF) television signals to the receiver shown therein. The FIG. 1 VSB DTV signal receiver is used for recovering error-corrected data in packet form, which packets are suitable for recording by a digital video cassette recorder or for decoding and presentation in a television set. The FIG. 1 receiver includes a radio-frequency (RF) amplifier 2 for amplifying a selected RF signal for application to first detector circuitry 3 for conversion to a first intermediate-frequency (I-F) signal. The first IF signal is in an ultra-high-frequency (UHF) intermediate-frequency band located above 890 MHz, the upper limit frequency of channel 83, the highest frequency ultra-high-frequency TV broadcast channel. The RF amplifier 2 has a bandpass filter that limits the frequency range of radio-frequency input signals to the 50 to 890 MHz band, rejecting image frequencies above the first IF band. The RF amplifier 2 also includes a broadband tracking filter that rejects television signals other than that selected for viewing, especially those signals of higher power such as analog TV signals in next-to-adjacent channels. The first detector 3 includes a first local oscillator for generating first local oscillations tunable over a range from 970 to 1730 MHz to place the first IF signal in a 6-MHz-wide band centered at about 920 MHz with the carrier nominally at 922.69 MHz. These first local oscillator frequencies are such that any leakage from the tuner input will not interfere with UHF TV channels as may be received by another television signal receiver nearby. At the same time second harmonics of UHF TV channels 14 through 69 fall above the first IF band. A first mixer included in the first detector 3 is a highly linear doubly-balanced type to avoid even harmonic generation, and there is a broadband tuned coupling for rejecting image frequencies in the first IF signal supplied from the first detector 3 to a first intermediate-frequency amplifier 4.

The first IF amplifier 4 is sometimes referred to as the "UHF intermediate-frequency amplifier" or "UHF IF amplifier" since it provides amplification of signals in an ultra-high-frequency first IF band above the UHF television broadcasting channels. The first IF signal exhibits a frequency spectrum reversal relative to the RF signal supplied to the first mixer in the first detector 3. The first IF amplifier 4 provides constant, linear gain to overcome the 10–12 dB insertion loss in a first surface-acoustic-wave filter included therein. This first SAW filter can be constructed on a gallium arsenide substrate. The constant gain makes it simpler for to drive the SAW filter at all times from the source impedance prescribed for avoiding multiple reflections that interfere with obtaining good group delay. Since its gain is not automatically adjusted, the first IF amplifier 4 is designed to have as much dynamic range as possible to avoid cross-modulation of co-channel interfering analog TV signals with DTV signals.

The first IF amplifier 4 response is supplied as input signal to a second detector 5, there to be mixed with second local oscillations to generate DTV signals translated to a very-high-frequency second IF band below the VHF television broadcasting channels. There is a broadband tuned coupling for rejecting image frequencies in output signal from the second detector 5, which can be provided by a second SAW filter. This second SAW filter is typically constructed on a lithium niobate substrate. Supposing that the response of the first SAW filter in first IF amplifier 4 is relied upon to define overall IF bandwidth, the second SAW filter has an amplitude response that is substantially flat over that bandwidth and exhibits a phase response that is substantially linear. If prior art practice is followed, second local oscillations having a frequency of 876 MHz are used to supply a second mixer in the second detector 5 and the downconversion result resides in a second intermediate-frequency band located in the 41–47 MHz frequency range conventionally used as the intermediate frequency band in analog TV signal receivers of single-conversion type. The first IF band may be displaced somewhat from 917–923 MHz and the second local oscillations may be at a frequency either below or above the first IF band in frequency. If the second local oscillations are below the first IF band in frequency, like the first IF signal the second IF signal supplied from the second detector 5 exhibits a frequency spectrum reversal relative to the RF signal supplied to the first detector 3. If the second local oscillations are above the first IF band in frequency, the second IF signal exhibits a frequency spectrum that is not reversed relative to the RF signal supplied to the first detector 3.

The second detector 5 response is supplied as input signal to a second intermediate-frequency amplifier 6. The second IF amplifier 6 is sometimes referred to as the "VHF intermediate-frequency amplifier" or "VHF IF amplifier" since it provides amplification of signals in a very-high-frequency second IF band below the VHF television broadcasting channels. The second IF amplifier 6 has a plurality of cascaded amplifier stages, which are controlled in gain as part of a delayed automatic-gain-control (AGC) system. An amplifier controlled in gain using AGC of reverse type generally has poorer noise figure than an amplifier controlled in gain using AGC of forward type in which amplifier stages are operated partially in a saturated condition, however. The noise figures of the stages in the second IF amplifier 6 are of less concern, owing to their later position in the amplifier chain, so these amplifier stages are preferably controlled in gain using AGC of reverse type better to keep non-linearity within reasonable limit. Controlling the gain of the second IF amplifier 6 using AGC of reverse type also makes it easier to prevent problems of phase shift as a function of change in modulation levels. In an analog TV receiver earlier IF amplifiers are preferably controlled in gain using AGC of forward type so that the video signal is free of noise that appears as "snow", particularly "color snow", on the television viewscreen. As long as noise is smaller than the smallest modulation steps in the DTV signal, so that the noise does not "capture" the data-slicing procedures used in symbol decoding, the presence of noise is of little consequence in a DTV signal receiver. The quantizing effects of the data-slicing procedures used in symbol decoding suppress the effects of noise until it exceeds the smallest modulation steps in the DTV signal. Infrequent bursts of noise that exceed the smallest modulation steps in the DTV signal can be corrected by the decoding of trellis coding and Reed-Solomon forward-error correction coding which decoding is performed later on in the VSB DTV signal receiver.

The second IF amplifier 6 response is supplied as input signal to a third mixer 7, there to be mixed with third local oscillations from a controlled third local oscillator 8. The local oscillator 8 and the mixer 7 function as a third detector to generate VSB DTV signal translated in frequency to a third IF band within a 1–10 MHz range. This lower intermediate frequency facilitates digitization of the VSB DTV signal by an analog-to-digital converter 9. Digitization is done at a multiple at least two of the symbol rate of the VSB DTV signal. The digitized VSB DTV signal is synchrodyned to baseband in circuitry 10 that comprises: filters for converting the digitized samples to complex form, read-only memory (ROM) storing sine and cosine lookup tables for a complex digital carrier, and a digital multiplier for complex numbers multiplying the result of converting digitized samples to complex form (as multiplicand) by the complex digital carrier (as multiplier) to generate a complex product comprising a stream of digital samples of the real portion of the baseband symbol coding and a parallel stream of digital samples of the imaginary portion of the baseband symbol coding. The stream of digital samples of the real portion of the baseband symbol coding and in some designs the stream of digital samples of the imaginary portion of the baseband symbol coding are supplied to an adaptive channel-equalization filter or equalizer 11.

A digital-to-analog converter 12 converts the digital samples of the imaginary portion of the baseband symbol coding to an analog error signal lowpass filtered by an automatic-frequency-and-phase control filter 13 to develop an automatic-frequency-and-phase control (AFPC) signal for the controlled third local oscillator 8, to complete an automatic-frequency-and-phase control (AFPC) feedback loop. The AFPC loop minimizes the low-frequency energy in the digital samples of the imaginary portion of the baseband symbol coding, which should be zero in baseband symbol coding of a VSB DTV signal, and maximizes the low-frequency energy in the digital samples of the real portion of the baseband symbol coding.

The digital samples of the real portion of the equalized baseband symbol coding from the equalizer 11 are supplied to a symbol decoder 14. The symbol decoder 14 customarily includes data slicer circuitry and a Viterbi decoder and often includes comb filtering to reject co-channel NTSC interference. The symbol decoding results are supplied to trellis decoder circuitry 15, which includes a respective trellis decoder and post coder for each of the independent codestreams in the VSB DTV signal, there being twelve such independent codestreams in the VSB DTV signal specified in the ATSC standard published 16 Sep. 1995. The trellis decoder circuitry 15 supplies its response to a de-interleaver 16 to be reformatted into successive 8-bit bytes and to undo the several-data-segment convolutional byte interleaving done at the transmitter. Burst errors in the trellis coding are dispersed in the de-interleaved forward error-corrected code bytes supplied to Reed-Solomon decoder circuitry 17 for correction of errors. The Reed-Solomon decoder circuitry 17 supplies the error-corrected data to de-randomizer circuitry 18 to undo the data randomization performed at the transmitter. The recovered data are then supplied from the de-randomizer circuitry 18 to a packet sorter 19. The packet sorter 19 selects packets of video information and packets of audio information for use in the remainder of the DTV signal receiver, which may comprise display and speaker components of a television set, or which may alternatively comprise the recording electronics of a digital recorder.

Sample clock generation circuitry 20 generates sampling clock signals that are harmonically related to the symbol rate of the received VSB DTV signal, preferably using a passband spectral-line timing recovery technique for sample clock phase synchronization. An envelope detector 21 detects the envelope of amplified VHF IF signal from the I-F amplifier 6. A narrow bandpass filter 22 selects the components of baseband signal occurring in the envelope detector 21 response at one-half baud rate (i.e. one-half symbol frequency). Circuitry 23 for synchronizing the sample clock with the symbol rate customarily comprises a frequency multiplier, a controlled oscillator, a clocked frequency divider and a phase detector, none of which elements are explicitly shown in FIG. 1. The frequency multiplier doubles or quadruples the frequency of the half-symbol-frequency response of the filter 22 to generate a frequency multiplier response. The clocked frequency divider divides the frequency of the oscillations from the controlled oscillator to generate a frequency divider nominally of the same frequency as the frequency multiplier response. An automatic frequency and phase control (AFPC) signal for the controlled oscillator is supplied from the phase detector which compares the phasing of the frequency divider response with the phasing of the frequency multiplier response. The controlled oscillator is preferably crystal controlled, so the AFPC needs primarily to make adjustments to phase. The controlled oscillator generates oscillations, the average-axis-crossings of which time the edges of sample clock signals.

The sample clock generation circuitry 20 supplies clocking signals to the ADC 9 and to the digital synchrodyne circuitry 10. These clocking signals are supplied at a sample rate that is a multiple at least two of symbol rate. The ADC 9 uses these clocking signals for controlling the digital sampling of the low final intermediate-frequency VSB DTV signal. The digital synchrodyne circuitry 10, the components of which are not explicitly shown in FIG. 1, includes an address counter for counting these clocking signals to generate addressing for a read-only memory that stores look-up tables for the sine and cosine of the complex digital carrier used for synchrodyning. The sample clock generation circuitry 20 supplies clocking signals at symbol rate to the data slicing circuitry in the symbol decoder 14. The sample clock generation circuitry 20 supplies clocking signals at symbol rate to the adaptive equalizer 11 for timing its output samples to the symbol decoder 14. If the adaptive equalizer 11 is a fractional equalizer rather than a synchronous equalizer, the sample clock generation circuitry 20 supplies further clocking signals to the equalizer 11 at a rate higher than symbol rate but related in whole-number-ratio to the symbol rate. The sample clock generation circuitry 20 supplies various clocking signals to the trellis decoder circuitry 15, the de-interleaver circuitry 16, the Reed-Solomon decoder circuitry 17, and the de-randomizer circuitry 18.

The sample clock generation circuitry 20 supplies clocking signals to a sample counter 24 which counts the number of samples in a data frame and then rolls over its count to provide a modular count. A frame start detector 25 resets the count from the sample counter 24 to a prescribed value when a frame start sequence is detected in the stream of digital samples of the real portion of the equalized baseband symbol coding supplied by the equalizer 11. The frame start detector 25 typically includes a finite-impulse-response digital filter with a kernel that provides a match filter for the frame start sequence, and a threshold detector for determining when the match filter response peaks.

A computer 26 determines the kernel weights for the digital filtering included in the adaptive equalizer 11. The FIG. 1 VSB DTV signal receiver differs from those known in the art in that digital samples of the real portion of the equalized baseband symbol coding are not received directly into the computer 26, but instead are comb filtered by a comb filter 30 that suppresses artifacts of co-channel NTSC interference that accompany these samples. The comb filter 30 includes a shift register 31 and a digital signed adder 32 operated as a subtractor. The shift register 31 is 1368 stages long, each stage being approximately 10–12 bits wide, and is operated as a clocked delay line for differentially delaying digital samples of the real portion of the equalized baseband symbol coding by the duration of two NTSC horizontal scan lines. The adder 32 differentially combines the differentially delayed digital samples of the real portion of the equalized baseband symbol coding to generate a difference signal containing GCR signal for application to the computer 26.

The general forms that the adaptive equalizer 11 and the computer 26 are apt to take are known to those skilled in the art of digital communications receiver design. The general forms that the adaptive equalizer 11 is likely to take are outlined in the BACKGROUND OF INVENTION, supra. The general form that the computer 26 preferably takes is determined in large measure by certain equalization system preferences.

The preference is for a system in which the kernel weights for the digital filtering are initialized by evaluating a prescribed training signal time-division-multiplexed with the digital modulation at the transmitter and received together with multi-path distortion at the receiver. The prescribed training signal with multi-path distortion as received by the receiver is compared with an ideal prescribed training signal free from multi-path distortion as stored at the receiver to evaluate the nature of the multipath distortion. The computer 26 has random-access memory (RAM) included therein for storing segments of the stream of digital samples of the real portion of the equalized baseband symbol coding supplied from the equalizer 11, which segments contain the received training signal or ghosts thereof. The computer 26 is receptive of the sample count from the sample counter 24 to have information concerning when the segments of that stream of digital samples which contain the received training signal or ghosts thereof occur, so a WRITE COMMAND can be supplied to the RAM, which is addressed by a portion of the sample count from the sample counter 24 during the writing of the RAM.

Especially if the differential delays between the principal received signal and its ghosts are not too long, discrete Fourier transform (DFT) methods can be used to initialize the kernel weights for the digital filtering in a very short time. The DFT of the prescribed training signal with multipath distortion as received by the receiver is calculated and divided by the DFT of the prescribed training signal to determine the DFT of the transmission channel, a process referred to as "characterizing the channel". The complement of the channel DFT describes the DFT the adaptive equalizer should have, and the kernel weights are determined accordingly. These calculations are carried out by a microprocessor with suitable software being included in the computer 26. The computer 26 can include read-only memory (ROM) for storing the DFT of the prescribed training signal; this saves having to calculate the DFT of the prescribed training signal from the prescribed training signal per se as stored and read from ROM.

If the differential delay between the principal received signal and a ghost thereof is substantial, several microseconds or tens of microseconds, a match filter for the training signal can be included in the computer 26 and used in conjunction with a microprocessor also included in the computer 26 for determining the differential delay and the relative magnitude of the ghost. This can speed up the calculation of kernel weights for filters which use programmable bulk delay between sparse groupings of taps to have non-zero weights The preference is for a system in which the kernel weights for the digital filtering after being initially determined thereafter continue to be adjusted by decision-directed methods. This permits changing multipath conditions to be tracked on a continuous basis. Decision-directed methods are best implemented by including a companion digital filter in the computer 26. Such a procedure using a least-mean-squares (LMS) optimization procedure implemented on a block basis is described in detail in U.S. Pat. No. 5,648,987 entitled "RAPID-UPDATE ADAPTIVE CHANNEL-EQUALIZATION FILTERING FOR DIGITAL RADIO RECEIVERS, SUCH AS HDTV RECEIVERS" issued 15 Jul. 1997 to J. Yang, C. B. Patel, T. Liu and A. L. R. Limberg. Such a procedure using an LMS optimization procedure implemented on a continuous basis is described in detail in allowed U.S. patent application Ser. No. 08/832,674 entitled "DYNAMICALLY ADAPTIVE EQUALIZER SYSTEM AND METHOD" filed 8 Apr. 1997 by A. L. R. Limberg. C. M. Zhao, X. Y. Hu and X. H. Yu indicate in their September 1998 paper "Block Sequential Least Squares Decision Feedback Equalization Algorithm with Application to Terrestrial HDTV Transmission" appearing in IEEE Transactions on Broadcasting, Vol. 44, No. 3, that using block-sequential LMS optimization procedures, rather than continuous LMS optimization procedures, permits a bit error rate of $3 \times 10^{-9}$ to be achieved with signals having 3.5 dB poorer signal-to-noise ratio.

Figure 2:
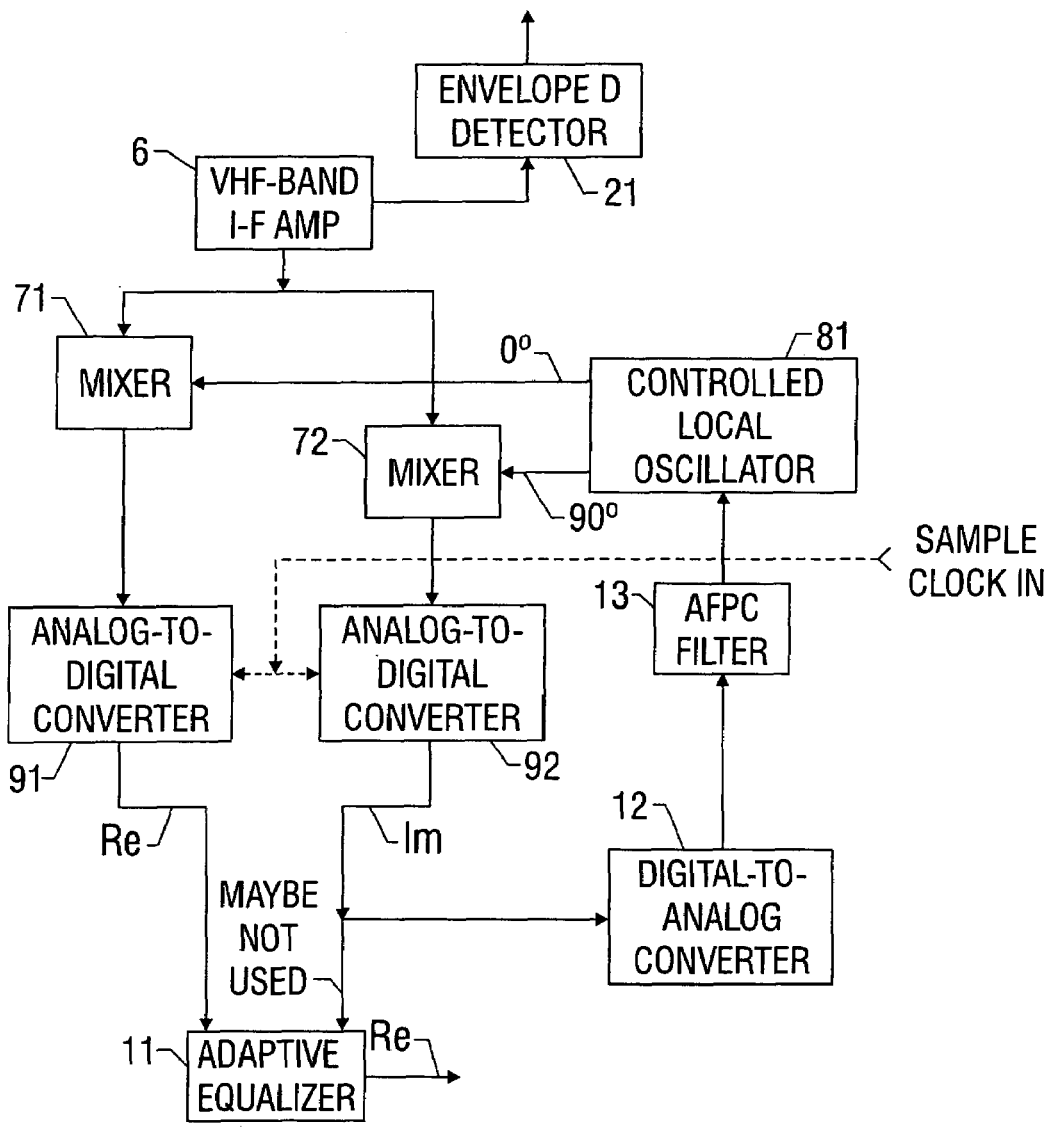
FIG. 2 is a block schematic diagram of modifications of the FIG. 1 vestigial-sideband digital television signal receiver that result in another vestigial-sideband digital television signal receiver, which embodies the invention in one of its aspects.
Figures 6A, 6B, 6C, 6D:
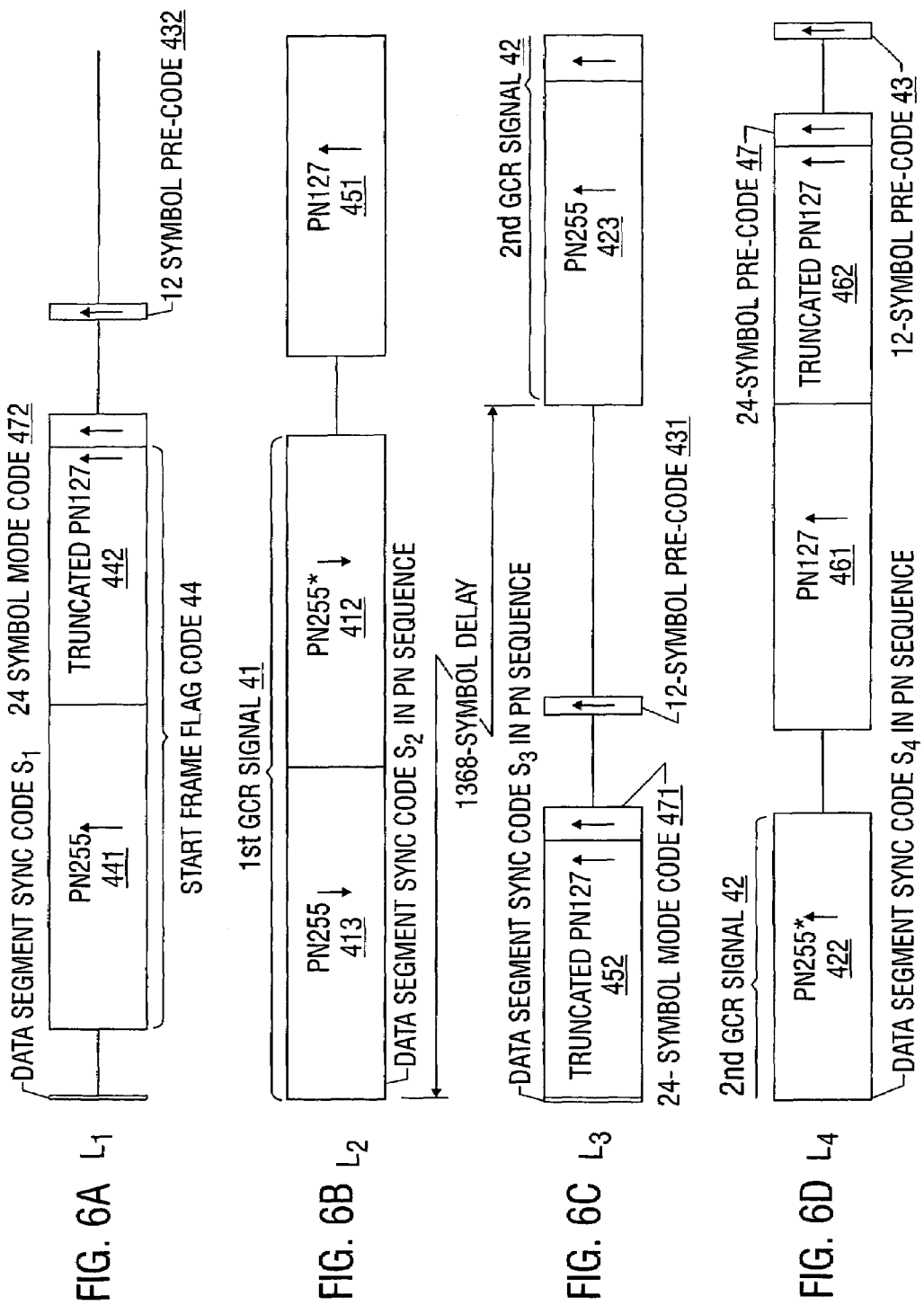
FIGS. 6A, 6B, 6C and 6D are timing diagrams showing the nature of the symbol coding in a data frame header consisting of the first four data segments $L_1$, $L_2$, $L_3$, and $L_4$ of each data frame of another VSB DTV signal embodying aspects of the invention.

FIG. 2 shows a modification of the FIG. 1 VSB DTV signal receiver in which the VHF IF amplifier 6 response is supplied to synchronous detectors 71 and 72 that replace the third mixer 7. In FIG. 2 the third local oscillator 8 is replaced by a third local oscillator 81 supplying third local oscillations in 00 phasing to the mixer 71 and in 90° phasing to the mixer 72, the frequency of the local oscillations being at the carrier frequency of the VSB DTV signal in the VHF IF amplifier 6 response. The ADC 9 is replaced by two analog-to-digital converters 91 and 92 which digitize the responses of the synchronous detectors 71 and 72 with a sampling rate that is a multiple at least two of the symbol rate of the VSB DTV signal. The ADC 91 digitizes the baseband symbol code response of the synchronous detector 71 to generate a stream of digital samples of the real portion of the baseband symbol coding supplied to the equalizer 11. The ADC 92 digitizes the baseband symbol code response of the synchronous detector 72 to generate a stream of digital samples of the imaginary portion of the baseband symbol coding supplied to the digital-to-analog converter 13 and to the equalizer 11 if the equalizer 11 is a complex equalizer.

Each successive pair of data frames consisting of four data fields, each with 313 data segments and an initial data segment containing data field synchronization code, that would occur in a VSB DTV signal generated in accordance with the ATSC standard published 16 Sep. 1995, is replaced in VSB DTV signals embodying certain aspects of the invention by a data frame with 1252 data segments, the first four data segments providing a frame header containing data field synchronization code and ghost-cancellation reference signal. VSB DTV signals that have data frames with a different number of data segments, but still have the first four data segments of each data frame containing data field synchronization code and ghost-cancellation reference signal, embody similar aspects of the invention and may prove preferable in practice. For example, data frames with 1294 or 1295 data segments make it simpler to temporally track groups of images than data frames with 1252 data segments do.

The underlying concept of the invention in a principal one of its aspects is that, when multi-path distortion is changing, dispersal of ghost-cancellation reference signal components into non-contiguous data segments that are to be later collected together makes it difficult or impossible to initialize the kernel weights in the adaptive equalizer 12 in the VSB DTV signal receiver so as to open the eye for data slicing. Placing the ghost-cancellation reference signal components into contiguous data segments reduces the effect of changing multi-path distortion on being able properly to combine the ghost-cancellation reference signal components, making it more likely that the kernel weights in the adaptive equalizer 12 can be initialized so as to open the eye for data slicing sufficiently that decision-directed procedures can then be instituted for further improving equalization and for tracking equalization to changing to initialize the kernel weights in the adaptive equalizer 12 in the VSB DTV signal receiver so as to open the eye for data slicing.

Arranging for a plurality data segments containing components of GCR signal to be contiguous makes it possible to arrange those components so that in a VSB DTV signal receiver a comb filter can combine the components to suppress artifacts of co-channel NTSC interference in baseband symbol code recovered by synchrodyne.

FIGS. 3A, 3B, 3C and 3D are timing diagrams showing one way to arrange the symbol coding in a data frame header consisting of the first four data segments $L_1$, $L_2$, $L_3$, and $L_4$ of each data frame of a vestigial-sideband digital television signal such that the comb filter 30 in the VSB DTV signal receiver of FIG. 1 or in such a receiver modified per FIG. 2 will recover ghost-cancellation reference signal in which co-channel NTSC interference is suppressed. In a VSB DTV receiver the four data segments $L_1$, $L_2$, $L_3$, and $L_4$ as recovered by synchrodyning the DTV signal to baseband are superposed on a direct component attributable to synchronous detection of the pilot carrier. This direct component is omitted in all the timing diagrams in the drawing, so that their remaining content is more readily understood. Furthermore, this direct component cancels in the response of the comb filter 30 and does not affect computations of kernel weights by the computer 29.

In FIGS. 3A, 3B, 3C and 3D the four data segments $L_1$, $L_2$, $L_3$, and $L_4$ begin with data segment sync codes $S_1$, $S_2$, $S_3$, and $S_4$, respectively. In the ATSC standard published 16 Sep. 1995 the data segment synchronization code group consists of four symbols having successive values of +S, −S, −S and +S. In possible revisions of this standard the data segment synchronization code group consists of six symbols that exhibit asymmetry. One such code group consists of six symbols having successive values of +S, −S, −S, −S, +S and +S; another such code group consists of six symbols having successive values of +S, +S, −S, −S, −S and +S; and other such code groups are the complements of the first two groups. The invention can accommodate the use of any of these data segment synchronization code groups.

FIG. 3A shows data segment $L_1$ as consisting of nothing after the data segment sync code $S_1$, unless an optional replica $S_3"$ of a later-included data segment sync code $S_3$ is transmitted. In actuality, the data segment $L_1$ is transmitted with an accompanying pilot signal which is ignored in FIG. 3A. Furthermore, in actuality post-ghosts of the data segment sync code $S_1$ and of the data previous thereto may extend 40 microseconds or so into the beginning of the 77.3-microsecond-long data segment $L_1$. The final 37.3 microseconds or so of the data segment $L_1$ are presumably absent of post-ghosts of the data segment sync code $S_1$ and of the data previous thereto, which facilitates the detection of pre-ghosts of the data segment sync code $S_2$ and data frame sync code in the ensuing data segment $L_2$.

FIG. 3B shows a first ghost-cancellation reference signal 41 located in the earlier portions of the data segment $L_2$, but after the data segment sync code $S_2$. A second ghost-cancellation reference signal 42 begins 1368 symbol epochs (two NTSC horizontal scan line durations) after the first GCR signal 41 begins and is complementary (opposite in sense of amplitude modulation) to the first GCR signal 41. Since data segment duration is 832 symbol epochs or so, the second GCR signal 42 begins late in the data segment $L_3$, as shown in FIG. 3C, and finishes early in the data segment $L_4$, as shown in FIG. 3D. FIG. 3D shows the data segment $L_4$ finishing with the 12-symbol pre-code 43 used to resume the twelve independent data codestreams prescribed by the ATSC standard published 16 Sep. 1995.

Presuming data segment duration is 832 symbol epochs, on the $537^{th}$ symbol epoch of the data segment $L_3$ shown in FIG. 3C there begins a repetition $S_2$ of the data segment sync code $S_2$ at the beginning of the data segment $L_2$ shown in FIG. 3B; and on the $537^{th}$ symbol epoch of the data segment $L_4$ shown in FIG. 3D there begins a repetition $S_3'$ of the data segment sync code $S_3$ at the beginning of the data segment $L_3$ shown in FIG. 3C. The repetitions $S_2'$ and $S_3'$ of the data segment sync codes $S_2$ and $S_3$ cancel responses to the data segment sync codes $S_2$ and $S_3$ from the comb filter 30 in the VSB DTV receiver. Accordingly, there is no data segment sync code $S_2$ in the comb filter 30 response to intrude upon the determination of pre-ghosts of the subtractively combined first and second GCR signals 41 and 42; and there is no data segment sync code $S_3$ in the comb filter 30 response to intrude upon the determination of post-ghosts of the subtractively combined first and second GCR signals 41 and 42. Including the optional replica $S_3"$ of data segment sync code $S_3$ in the $297^{th}$ through $300^{th}$ symbol epochs of the data segment $L_1$ cancels an earlier response to the data segment sync code $S_3$ in the comb filter 30 response so as not to intrude upon the determination of pre-ghosts of the subtractively combined first and second GCR signals 41 and 42 that are very advanced in time before the principal signal, so much so that inclusion of the replica $S_3"$ of data segment sync code $S_3$ is probably not of much benefit.

The GCR signals 41 and 42 are a substantial number of symbols in length, to increase the sensitivity of the match filtering for detecting low-energy ghosts. The length of these GCR signals is limited by the desire that GCR signal 42 finish sufficiently before the 12-symbol pre-code 43 at the end of the data segment $L_4$ that post-ghost calculations can reach for at least 40 microseconds (431 symbol epochs) without encountering background clutter. This limits the duration of GCR signals 41 and 42 to around 685 symbol epochs. If the GCR signals 41 and 42 were to be pseudo-random noise sequences, favored because of their pronounced auto-correlation responses, PN511 sequences would be the longest possible ones. Rather than using a PN511 sequence as the basis of the GCR signals 41 and 42, it is preferable to use two PN255 sequences in cascade, which two PN255 sequences are orthogonal to each other. A PN sequence that is orthogonal to another PN sequence has substantially zero cross-correlation with the other. Simply reversing the order of a PN sequence is one way to generate another PN sequence, which two PN sequences are orthogonal to each other.

FIG. 3B shows the GCR signal 41 being composed of a PN255 sequence 411 immediately followed by an orthogonal PN255* sequence 412. FIGS. 3C and 3D show the GCR signal 42 being composed of a PN255 sequence 421 immediately followed by an orthogonal PN255* sequence 422. The downward arrows on the two sequences 411 and 412 and the upward arrows on the two sequences 421 and 422 are indicative of the complementary senses of modulation of the GCR signals 41 and 42. The selection of particular PN255 sequences for the GCR signals 41 and 42 is restricted by the need for the data segment sync code $S_4$ to be subsumed in the orthogonal PN255* sequence 422.

Cascading two orthogonal PN255 sequences provides the option of calculating kernel weights based on just one of the PN255 sequences without interference from the other. This option can be used to reduce match filter hardware costs in a less expensive, lower performance VSB DTV receiver. In a higher quality VSB DTV receiver this option can speed calculations during rapid changes in selected channel.

FIGS. 4A, 4B, 4C and 4D illustrate that the portions of the data segments $L_1$, $L_2$, $L_3$, and $L_4$ in the data frame header that are shown as free of symbols in FIGS. 3A, 3B, 3C and 3D can in fact be occupied by symbols without interfering with kernel weighting calculations by the computer 29, so long as the symbols are repeated so as to cancel from those portions of the comb filter 30 response that are used for determining the locations of pre-ghosts and post-ghosts. These symbols may be used to code program information used to screen the channels to be viewed, for example. These symbols may provide for a frame start flag code that is shorter in length than the training signal for the channel equalization filtering.

FIG. 4A shows a frame start flag code 44 composed of a pseudo-random noise pair-sequence 441 followed by a truncated repetition 442 thereof positioned within the data segment $L_1$. A pseudo-random noise pair-sequence or "PNP sequence" is defined as a pseudo-random noise sequence where the symbol rate of the sequence is half normal symbol rate, so each symbol insofar as the PNP sequence is concerned is a pair of symbols insofar as the data transmission system or a regular PN sequence is concerned. A reason for PN pair sequences or "PNP sequences" being preferred by the inventors as frame-start flag codes is that match filter response to these sequences can be obtained even under conditions where symbol synchronization has not yet been perfected. This can speed up getting the VSB DTV signal receiver into operation. The PNP sequences can provide the basis for sensitive phase adjustments of the symbol clock.

The PNP sequence 441 is a PNP127 sequence consisting of 127 pairs of once-repeated symbols of normal symbol rate, occupies 254 symbol epochs, and has successive values of +S, +S, −S, −S, +S and +S in the last six of those symbol epochs. A duplicate 451 of the PNP sequence 441 starts 1368 symbol epochs later than the PNP sequence 441 starts. The PNP sequence 451 starts within the data segment $L_2$, as shown in FIG. 4B, and finishes with its last five symbols at the very beginning of data segment $L_3$, as shown in FIG. 4C. This provides for the data segment sync code $S_3$ to be subsumed in the PNP sequence 451.

The PNP sequence 441 finishes 1368 symbol epochs earlier than the PNP sequence 451 starts, so the PNP sequence 441 finishes on the $301^{th}$ symbol epoch of data segment $L_1$ and consequently begins 254 symbol epochs earlier on the $48^{th}$ symbol epoch of data segment $L_1$. The truncated PNP sequence 441 starts on the $301^{st}$ symbol epoch of data segment $L_1$ and finishes after the $431^{st}$ symbol epoch of data segment $L_1$, but not later than the $522^{nd}$ symbol epoch of data segment $L_1$.

A second duplicate 461 of the PNP sequence 441 starts 1368 symbol epochs later than the PNP sequence 451 starts and so starts on the $288^{th}$ symbol epoch of data segment $L_4$, per the showing of FIG. 4D. The first duplicate 451 of the PNP sequence 441 is immediately followed by a first duplicate 452 of the truncated PNP sequence 442 in data segment $L_3$ as shown in FIG. 4C. The second duplicate 461 of the PNP sequence 441 is immediately followed by a second duplicate 462 of the truncated PNP sequence 442 in data segment $L_4$ as shown in FIG. 4D.

The 12-symbol pre-code 43 at the finish of the data segment $L_4$ is shown in FIG. 4C as being preceded by a duplicate 12-symbol pre-code 431 beginning in the data segment $L_3$ 1368 symbol epochs earlier than the 12-symbol pre-code 43. The duplicate 12-symbol pre-code 431 cancels the 12-symbol pre-code 43 in the comb filter 30 response to increase the time that there is no background clutter to interfere with the computer 29 calculation of post-ghosts. The duplicate 12-symbol pre-code 431 is shown in FIG. 4A as being preceded by another duplicate 12-symbol pre-code 432 beginning in the data segment $L_1$ 1368 symbol epochs earlier than the 12-symbol pre-code 431. The duplicate 12-symbol pre-code 432 cancels the 12-symbol pre-code 431 in the comb filter response to maintain the time that there is no background clutter to interfere with the computer 29 calculation of pre-ghosts.

A 24-symbol transmission mode code 47 is disposed in the data segment $L_4$ shown in FIG. 4D; a duplicate 471 of the mode code 47 beginning 1368 symbol epochs earlier than the mode code 47 begins is disposed in the data segment $L_3$ shown in FIG. 4C; and a further duplicate 472 of the mode code 47 beginning 2736 symbol epochs earlier than the mode code 47 begins is disposed in the data segment $L_1$ shown in FIG. 4A. These 24-symbol transmission mode codes 47, 471 and 472 can be delayed up to the point where the 12-symbol pre-codes would be overlapped. Alternatively, 24-symbol transmission mode codes 47, 471 and 472 can be advanced to precede the PNP sequences 441, 451 and 461, respectively, up to the point where the PN255* sequences 412 and 422 would be overlapped. In yet another variant the 24-symbol transmission mode code 472 can be dispensed with and the 24-symbol transmission mode codes 47 and 471 advanced to positions prior to the data segment sync codes $S_2'$ and $S_2$, respectively, up to the point where the sequences 412 and 422 would be overlapped.

A problem with the data frame header shown in FIGS. 3A, 3B, 3C and 3D is that the repetitions $S_2'$ and $S_3'$ of the data segment sync codes $S_2$ and $S_3$ violate the mandate of the ATSC standard published 16 Sep. 1995 that a code group consisting of four symbols having successive values of +S, −S, −S and +S not be repeated at a 832-symbol interval unless it is positioned at the beginning of the data segment to be used as data segment synchronization code. This problem is also found in the data frame header shown in FIGS. 4A, 4B, 4C and 4D. This problem can be avoided simply, by omitting the data segment sync code $S_2$ at the beginning of the data segment $L_2$ and by omitting the repetition $S_2'$ of that data segment sync code within the succeeding data segment $L_3$. Alternatively, this problem can be avoided simply, by omitting the data segment sync code $S_3$ at the beginning of the data segment $L_3$, by omitting the repetition $S_3'$ of the data segment sync code $S_3$ within the succeeding data segment $L_4$, and by omitting any duplicate $S_3'$ of data segment sync code $S_3$ within the data segment $L_1$. The circuitry used for detecting data segment sync code normally includes provision for accommodating the non-occurrence of such code at the beginning of one data segment.

FIGS. 5A, 5B, 5C and 5D show a variant of the data frame header shown in FIGS. 3A, 3B, 3C and 3D that avoids the violation of the ATSC standard published 16 Sep. 1995 in a more elegant manner by subsuming the data segment sync code $S_3$ within the first four symbol epochs of a PN255 sequence 411', which replaces the PN255 sequence 411 and is generated by cylindrical rotation of the PN255 sequence 411 until a data segment sync code heads the PN sequence. The PN255 sequence 421 is replaced by a PN255 sequence 421', which is complementary to the PN255 sequence 411'. Since the PN255 sequence 421' is complementary to the PN255 sequence 411', the data segment sync code $S_3$ is not repeated in the beginning of the PN255 sequence 421'.

Along the same lines, FIGS. 6A, 6B, 6C and 6D show a variant of the data frame header shown in FIGS. 4A, 4B, 4C and 4D that avoids the violation of the ATSC standard published 16 Sep. 1995, by subsuming the data segment sync code $S_3$ within the PN255 sequence 411'. The data frame headers shown in FIGS. 5A, 5B, 5C and 5D and in FIGS. 6A, 6B, 6C and 6D permit ready correction of pre-ghosts up to 37.3 microseconds in advance of the principal signal without interference of post-ghosts delayed as much as 40 microseconds from the principal signal, then subsequent correction of post-ghosts delayed 20.9 to 58.2 microseconds from the principal signal without interference of pre-ghosts or other background clutter, then subsequent correction of pre-ghosts up to 56.4 microseconds in advance of the principal signal without interference of post-ghosts delayed more than 20.9 microseconds from the principal signal, then subsequent correction of post-ghosts delayed 1.8 to 20.9 microseconds from the principal signal without interference of pre-ghosts, then subsequent correction of pre-ghosts up to 75.5 microseconds in advance of the principal signal without interference of post-ghosts delayed more than 1.8 microseconds from the principal signal, then subsequent correction of post-ghosts delayed less than 1.8 microseconds from the principal signal, and then correction of micro-ghosts in a final equalization step. The later ghost-cancellation and equalization steps may be performed more expeditiously using discrete Fourier transform methods.

FIGS. 7A, 7B, 7C and 7D show a variant of the data frame header shown in FIGS. 5A, 5B, 5C and 5D that increases the capability for suppressing post-ghosts delayed over post-ghosts delayed over 58.2 microseconds from the principal signal without interference from background clutter, while reducing the capability for suppressing pre-ghosts far in advance of principal signal. The first GCR signal 41 and second GCR signal 42 are advanced in time so that the first GCR signal 41 commences in the first data segment $L_1$ more than 58.2 microseconds into the data segment. The PN255 sequence 413 is replaced by a PN255 sequence 414 generated by cylindric rotation of the PN255 sequence 413 until the data segment sync code is positioned within the PN sequence so as to fall at the outset of the second data segment $L_2$. The PN255 sequence 423 is replaced by a PN255 sequence 424 that is complementary to the PN255 sequence 414.

Along the same lines, FIGS. 8A, 8B, 8C and 8D show a variant of the data frame header shown in FIGS. 6A, 6B, 6C and 6D that increases the capability for suppressing post-ghosts delayed over post-ghosts delayed over 58.2 microseconds from the principal signal without interference from background clutter, while reducing the capability for suppressing pre-ghosts far in advance of principal signal. Advancing the GCR signals 41 and 42 so that the first GCR signal 41 commences in the first data segment $L_1$ lifts the restriction of the duration of each of these GCR signals from around 685 symbol epochs towards 1023 symbol epochs, so that the use of PN sequences of longer length and better noise-rejection capability can be contemplated.

FIGS. 9A, 9B, 9C and 9D show a data frame header in which a first GCR signal 51 comprises an initial PN511 sequence 511, which commences in the first data segment $L_1$ and has its last four symbols at the beginning of the second data segment $L_2$ so as to provide the data segment sync code $S_2$, and a final PN511 sequence 512, which is disposed entirely within the second data segment $L_2$. A second GCR signal 52 begins 1368 symbol epochs after the first GCR signal 51 begins. The second GCR signal 52 comprises an initial PN511 sequence 521, which occupies the $29^{th}$ through $540^{th}$ symbol epochs of the third data segment $L_3$, and a final PN511 sequence 522, which begins in the third data segment $L_2$ and finishes in the fourth data segment $L_4$. The data segment sync code $S_4$, at the outset of the fourth data segment $L_4$, is subsumed in the final PN511 sequence 522. A repetition 531 of the beginning of the PN511 sequence 521 starts 1368 symbol epochs after the PN511 sequence 521 starts.

FIG. 9B shows a first repetition $S_1'$ of the data segment sync code $S_1$ that begins 1368 symbol epochs after the data segment sync code $S_1$ begins, and FIG. 9D shows a second repetition $S_1''$ of the data segment sync code $S_1$ that begins 1368 symbol epochs after the first repetition $S_1'$ of the data segment sync code $S_1$ begins. FIG. 9D also shows a repetition $S_3'$ of the data segment sync code $S_3$ that begins 1368 symbol epochs after the data segment sync code $S_3$ begins, and FIG. 9A shows another duplicate $S_3''$ of the data segment sync code $S_3$ that begins 1368 symbol epochs before the data segment sync code $S_3$ begins. Accordingly, the comb filter 30 used for suppressing artifacts of co-channel NTSC interference in the baseband symbol code received by VSB DTV signal receiver is not responsive to the data segment sync code $S_1$ nor to the data segment sync code $S_3$.

FIG. 9D shows the 24-symbol mode code 47 located just prior to the repetition $S_3'$ of the data segment sync code $S_3$. This location of the 24-symbol mode code 47 or an alternative location just after the second repetition $S_1''$ of the data segment sync code $S_1$ leaves room for insertion of a 272-symbol frame-start flag code next to the mode code and between the code segments $S_1''$ and $S_3'$, if a designer desires. A PNP127 sequence will fit into this space with a little bit of room for repetition.

Figure 10:
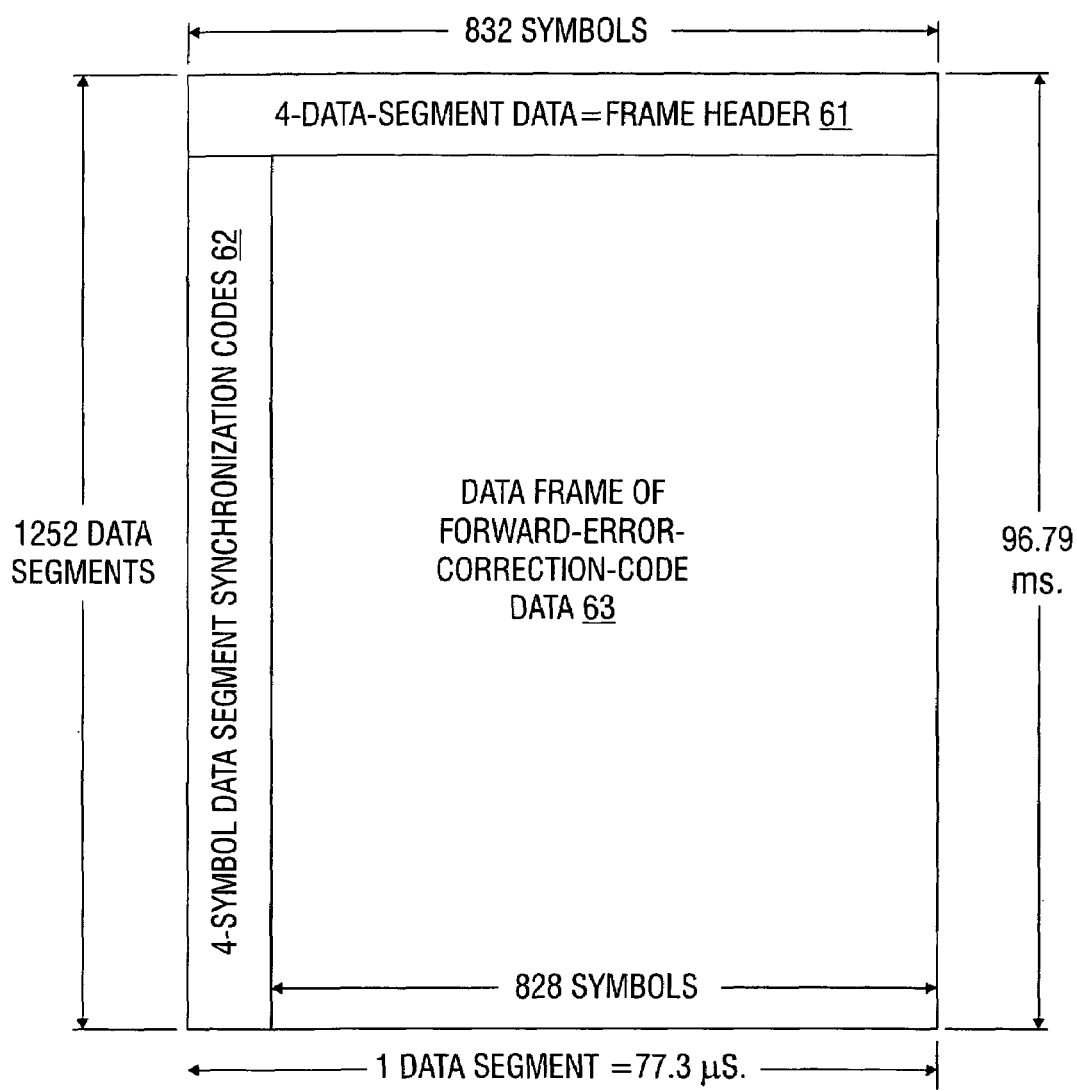
FIG. 10 is a diagram of a 1252-data-segment data frame of less than 100 millisecond duration, which data frame includes a frame header consisting of the four data segments $L_1$, $L_2$, $L_3$, and $L_4$, each being 832 symbol epochs in duration.

FIG. 10 diagrams a data frame of 1252 data segments, with time progressing left to right and top to bottom. The initial four data segments in the data frame are a data header 61 composed of data segments $L_1$, $L_2$, $L_3$, and $L_4$ as described above. The last 1248 data segments begin with respective four-symbol data synchronization codes 62, as do at least certain ones of the data segments $L_1$, $L_2$, $L_3$, and $L_4$ in the data header 61. The respective four-symbol data synchronization codes 62 in the last 1248 data segments are followed by error-correction coded data payload 63. Payload data rate using the 1252-data-segment data frame with four-data-segment header is 19.28 Mbps, the same as with the current ATSC standard. The 1252-data-segment data frame with 4-data-segment data field synchronization code shown in FIG. 10 replaces four of the 313-data-segment data fields with respective data field synchronization codes per the ATSC DTV standard published 16 Sep. 1995. The one-tenth of a second interval between data frame synchronization code headers supplies training signal for correcting the DTV receiver equalization frequently enough to permit successive tuning of various channels without hesitation in acquiring each new channel being noticeable to a person viewing the televised images.

A problem with the 1252-data-segment frame of FIG. 10 is that 5.17 data frames are co-extensive with a 15-image-frame group of pictures (GOP) that is of 0.5005005005005 second duration. This presents problems in cueing and editing of digital television recording tapes on a digital frame basis. It is preferable that insofar as possible the 15-image-frame GOP be co-extensive in time with five data frames. This also provides for a 3-, 6-, 9- or 12-image-frame GOP being coextensive in time with an integral number of data frames. A data frame with 1294 or 1295 of the 832-symbol data segments therein is much closer to what is desired. At times, initialization of the adaptive equalizer can take no shorter a time than the duration of 1079 data segments (about $\frac{1}{12}^{th}$ second) required worst case for acquiring the training signal and will take somewhat more time for calculation of the kernel weights for the adaptive equalizer. This is adequate speed for initialization of the adaptive equalizer response.

Figure 11:
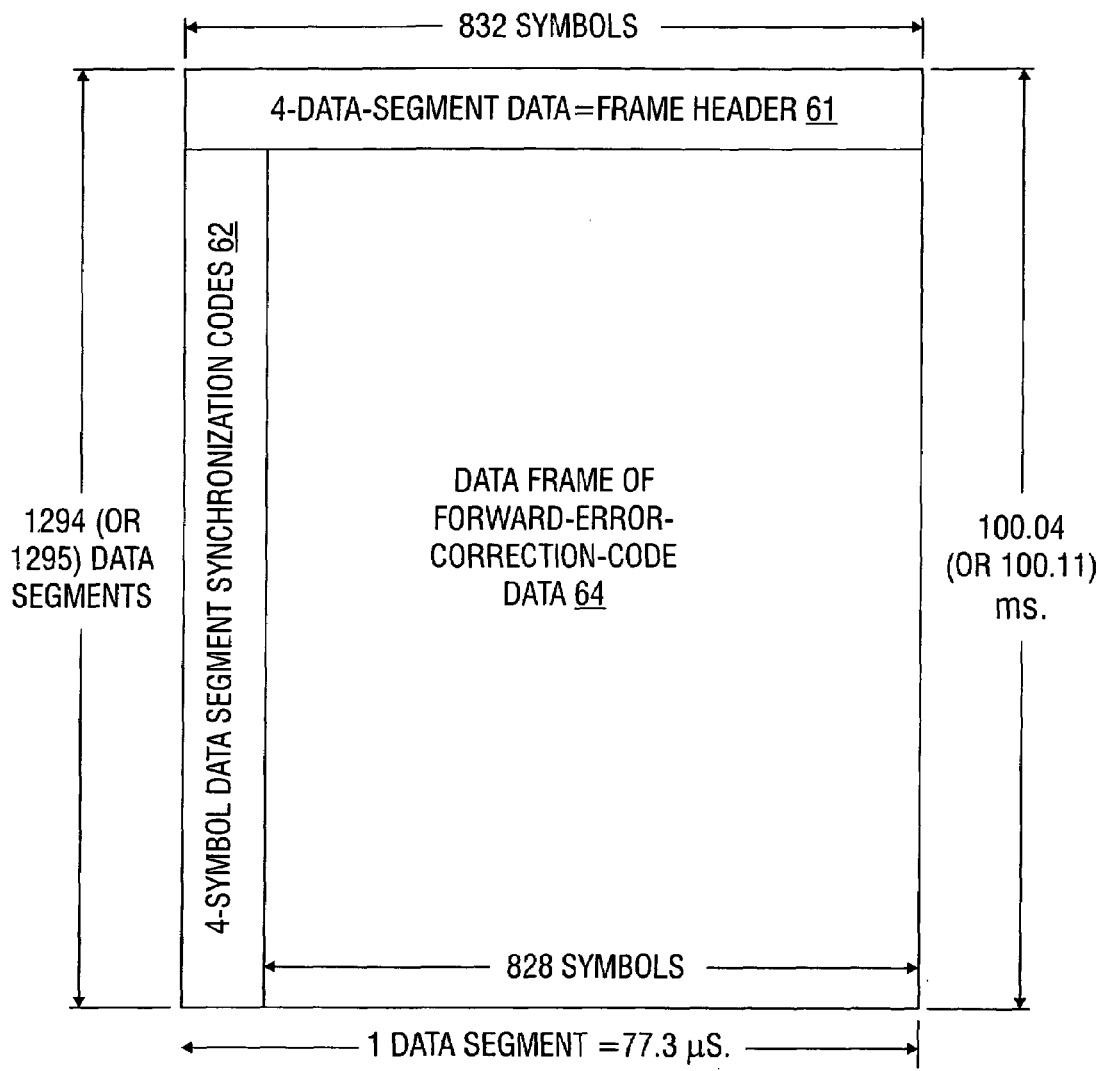
FIG. 11 is a diagram of a data frame of slightly more than 100 millisecond duration, which data frame includes a frame header consisting of the four data segments $L_1$, $L_2$, $L_3$, and $L_4$, each being 832 symbol epochs in duration.

FIG. 11 diagrams a data frame of 1294 data segments, with time progressing left to right and top to bottom. The initial four data segments in the data frame are a data header 61 composed of data segments $L_1$, $L_2$, $L_3$, and $L_4$ as described above. The last 1290 data segments begin with respective four-symbol data synchronization codes 62, as do at least certain ones of the data segments $L_1$, $L_2$, $L_3$, and $L_4$ in the data header 611. The respective four-symbol data synchronization codes 62 in the last 1290 data segments are followed by error-correction-coded data payload 64.

The use of a data frame with 1294 data segments therein makes it desirable to redesign the convolutional interleaving in the transmitted VSB DTV signal and the convolutional de-interleaver 16 in the VSB DTV receiver of FIG. 1. Re-design is desirable because the 52-data-segment interleaving depth that fits exactly six times into the 312-data-segment data field (sans header) in the 1995 ATSC standard does not fit an integral number of times into the 1290-data-segment error-correction-coded data payload 64. It is desirable that the interleaving depth exactly fit an integral number of times into the data frame, to facilitate switching between signal sources at the DTV transmitter. A 43-data-segment interleaving depth fits exactly 30 times into the 1290-data-segment data frame (sans header). There can be less storage in the de-interleaver 16 than required in a de-interleaver for VSB DTV signal conforming to the 1995 ATSC standard. Impulse noise must be less than 43 symbol epochs duration to be treated as single errors by the R-S decoder 20, but impulse noise is usually shorter than this four microsecond interval if the RF and IF amplifiers in the DTV signal receiver are designed reasonably well. Alternatively, an 86-data-segment interleaving depth fits exactly 15 times into the 1290-data-segment error-correction-coded data payload 64. While more buffer memory is required for the greater interleaving depth, error correction for long-duration impulse noise is improved. In yet another alternative, a 215-data-segment interleaving depth fits exactly six times into the 1290-data-segment error-correction-coded data payload 64, but still more buffer memory is required for the even greater interleaving depth.

Payload data rate using the 1252-data-segment data frame with four-data-segment header is 19.28 Mbps, the same as with the current ATSC standard. Using a 1294-data-segment data frame with a four-data-segment header increases payload data rate slightly above the 19.28 Mbps achieved using the 1252-data-segment data frame with four-data-segment header. A variant using a 1295-data-segment data frame with a five-data-segment header reduces payload data rate to 19.267 Mbps, but there is closer temporal tracking of image frames and data frames.

The data segment synchronization codes beginning data segments in the current ATSC standard are overhead that is unnecessary for a well-designed data communications receiver. The data segment synchronization codes were used in primitive DTV receiver designs for periodically correcting sampling clock rates to concur with symbol rate. Sampling clock rate adjustments are preferably made on a continuous basis using spectral line filtering of intermediate-frequency signal envelope to recover a symbol rate subharmonic and synchronizing sampling clock rate to the recovered symbol rate subharmonic. The interposition of the data segment synchronization codes into trellis coding undesirably complicates the trellis decoding procedures in the receiver.

Figure 12:
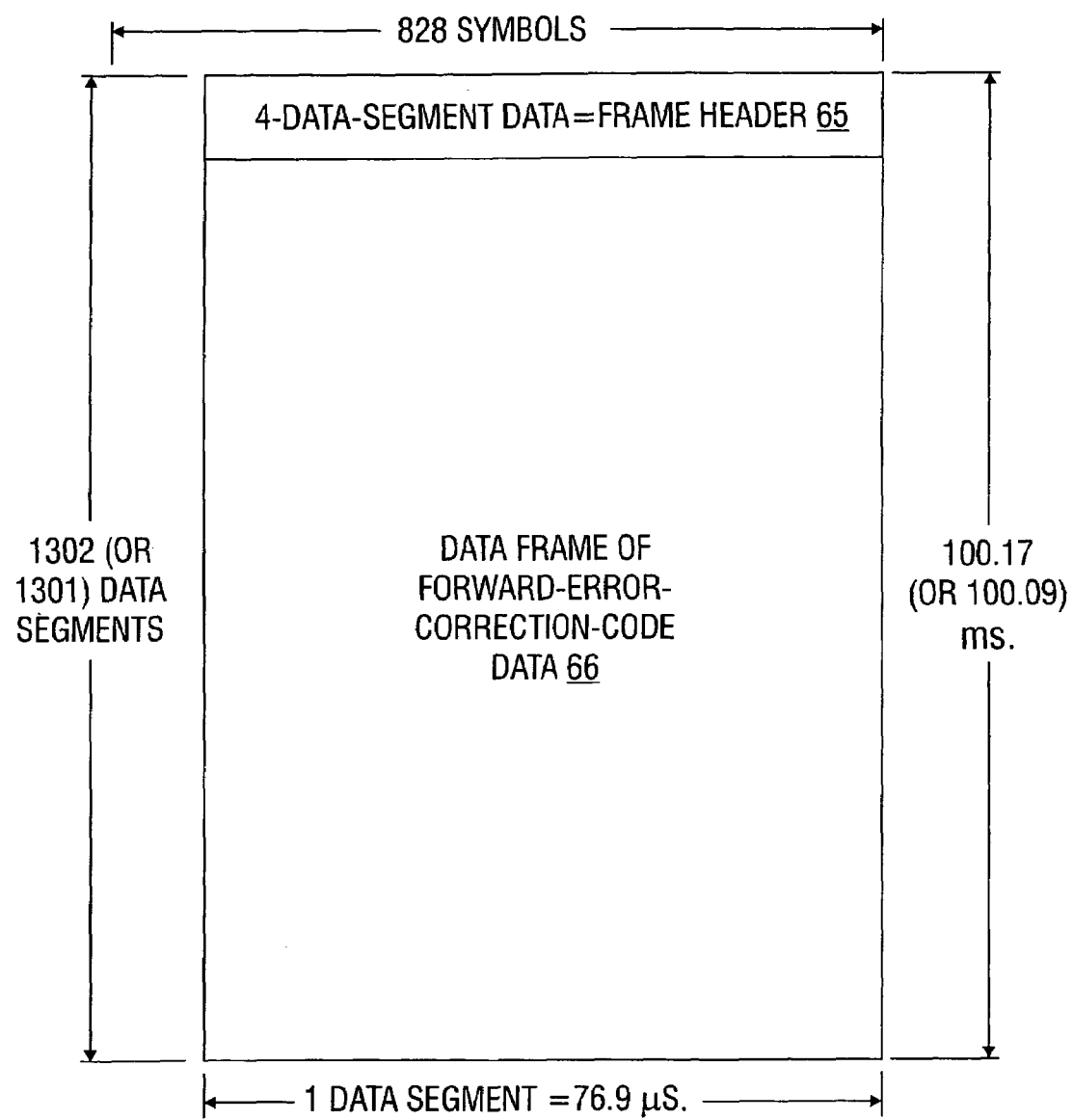
FIG. 12 is a diagram of a data frame of slightly more than 100 millisecond duration, which data frame includes a frame header consisting of the four data segments $L_1$, $L_2$, $L_3$, and $L_4$, each being 828 symbol epochs in duration.

FIG. 12 diagrams a data frame of 1302 data segments, with time progressing left to right and top to bottom. Data segment synchronization codes are discarded to leave 828-symbol data segments in a data header 65 and in an error-correction-coded data payload 66. The general nature of the data header 65 is similar to that of the data header 61. Payload data rate using these 1302-data-segment data frames with four-data-segment headers is 19.38 Mbps. The convolutional interleaving in the transmitted VSB DTV signal and the convolutional de-interleaver 16 in the FIG. 1 VSB DTV signal receiver are re-designed. A 59-data-segment interleaving depth fits exactly 22 times into the 1298 data segments of the data payload 66. Alternatively, a 118-data-segment interleaving depth fits exactly eleven times into the 1298 data segments.

In a variant of the scheme illustrated in FIG. 12 a data frame of 1301 data segments with a five-data-segment header is used, leaving 1296 data segments per frame for trellis-coded data. Payload data rate using these 1301-data-segment data frames with five-data-segment headers is 19.36 Mbps. A 54-data-segment interleaving depth fits exactly 24 times into the 1296 data segments of the 1301-data-segment error-correction-coded data payload. Alternatively, a 72-data-segment interleaving depth fits exactly 18 times into the 1296 data segments. In still further alternatives, a 108-data-segment interleaving depth fits exactly 12 times into the 1296 data segments, or a 144-data-segment interleaving depth fits exactly 9 times into the 1296 data segments. The 54-, 72- and 108-data-segment interleaving depths lend themselves particularly to time-division multiplexing of six reduced-resolution television signals in each data frame.

While ghost-reference signals composed of just pairs of orthogonal PN sequences have been described, ghost-reference signals with a larger number of orthogonal PN sequences exist, which can be used in further embodiments of the invention. Such ghost-reference signals can, for example, each be composed of cascaded complementary sequences as described in U.S. Pat. Nos. 5,341,177 and 5,361,102 issued to Sumit Roy, C. B. Patel and J. Yang on 23 Aug. 1994 and on 1 Nov. 1994, respectively, and respectively entitled "SYSTEM TO CANCEL GHOSTS GENERATED BY MULTIPATH TRANSMISSION OF TELEVISION SIGNAL" and "SYSTEM TO CANCEL GHOSTS IN NTSC TELEVISION TRANSMISSION". The advantage of a ghost-reference signal composed of cascaded complementary sequences as compared to a ghost-reference signal consisting of a PN sequence is that it contains all spectral frequency components with substantially equal energies.

Trellis coding in a VSB DTV signal per the 1995 ATSC standard extends continuously from frame to frame. This complicates switching between signal sources at the broadcast transmitter or in the studio, especially when the DTV signal time-division-multiplexes a plurality of programs and services. A better practice is to restart trellis coding at the beginning of each block of data segments that are convolutionally interleaved with each other, or at least at the beginning of the first block of such data segments in each data frame. The trellis coding is preferably restarted after the data frame header using a prescribed precode, so precode information does not have to be included in the transmitted signal.

The invention claimed is:

1. A data signal receiver for an electromagnetic wave signal including a pilot carrier and vestigial sideband modulation of a suppressed carrier of the same frequency and phase as said pilot carrier, said vestigial sideband modulation being in accordance with a baseband signal having a uniform symbol rate substantially 684 times the horizontal scan line rate of an NTSC television signal that is apt to accompany said electromagnetic wave signal as a co-channel interfering signal, said baseband signal composed of consecutive data segments each consisting of a prescribed integral number of symbol epochs, said consecutive data segments being divided into contiguous data frames each consisting of a prescribed integral number M of contiguous ones of said data segments, each said data frame characterized by beginning with a data frame header including a plurality N in number of contiguous ones of said data segments and concluding with a plurality (M-N) in number of said data segments including consecutive multi-level symbols used for transmitting data, said data segments used for special purposes in each said data frame including a first ghost-cancellation reference signal and a second ghost-cancellation reference signal at a prescribed time interval thereafter, which said first and second ghost-cancellation reference signal exhibit respective variations that are complementary to each other, said data signal receiver comprising:

circuitry for selecting said electromagnetic wave signal, converting the frequencies of said electromagnetic wave signal after its selection, and amplifying said electromagnetic wave signal after its selection and conversion in frequency;

circuitry for synchrodyning said electromagnetic wave signal to baseband after its selection, conversion in frequency and amplification and supplying digitized samples of a baseband signal resulting from synchrodyning said electromagnetic wave signal to baseband;

an adaptive equalizer for receiving said samples of a baseband signal resulting from synchrodyning said electromagnetic wave signal to baseband, and supplying an equalizer response to those received samples as weighted by kernel weights that are electrically adjustable;

circuitry for regenerating transmitted data from said equalizer response;

a comb filter for differentially delaying said equalizer response, so said first ghost-cancellation reference signal in the more delayed equalizer response occurs simultaneously with said second ghost-cancellation reference signal in the less delayed equalizer response, and subtractively combining said more delayed equalizer response and said less delayed equalizer response to generate a comb filter response; and a computer responsive to selected portions of said comb filter response including the result of subtractively combining said first and second ghost-cancellation reference signals, for performing initial electrical adjustments of the kernel weights of said adaptive equalizer whenever said data signal receiver is initially operated after a time of in operation or whenever said electromagnetic wave signal is initially selected.

2. The data signal receiver of claim 1, wherein said comb filter differentially delays said equalizer response by substantially 1368 symbol epochs to generate said more delayed equalizer response and said less delayed equalizer response for being subtractively combined to generate said comb filter response.

3. The data signal receiver of claim 1, in which during continued operation of said said data signal receiver said computer continues to electrically adjust the kernel weights of said adaptive equalizer responsive to selected portions of said comb filter response including the result of subtractively combining said first and second ghost-cancellation reference signals.

4. The data signal receiver of claim 3, wherein said comb filter differentially delays said equalizer response by substantially 1368 symbol epochs to generate said more delayed equalizer response and said less delayed equalizer response for being subtractively combined to generate said comb filter response.

5. The data signal receiver of claim 1, in which during continued operation of said said data signal receiver said computer electrically adjusts the kernel weights of said adaptive equalizer responsive to said comb filter response on a decision-directed basis.

6. The data signal receiver of claim 5, wherein said comb filter differentially delays said equalizer response by substantially 1368 symbol epochs to generate said more delayed equalizer response and said less delayed equalizer response for being subtractively combined to generate said comb filter response.

7. An electromagnetic wave signal received and processed by a television signal receiver, said signal comprising vestigial sideband modulation of a suppressed carrier in accordance with a baseband signal having a uniform baud rate or symbol rate substantially 684 times the horizontal scan line rate of an NTSC television signal that is apt to accompany said electromagnetic wave signal as a co-channel interfering signal, said baseband signal composed of consecutive data segments each consisting of a prescribed integral number of symbol epochs, said consecutive data segments being divided into contiguous data frames each consisting of a prescribed integral number M of contiguous ones of said data segments, each said data frame characterized by beginning with a data frame header including a plurality N in number of contiguous ones of said data segments and concluding with a plurality (M-N) in number of said data segments including consecutive multi-level symbols used for transmitting data, said data frame header in each said data frame including a first ghost-cancellation reference signal and a second ghost-cancellation reference signal beginning substantially 1368 symbol epochs later than said first ghost-cancellation reference signal, which said first and second ghost-cancellation reference signal exhibit respective variations that are complementary to each other.

8. The electromagnetic wave signal of claim 7, wherein each of said plurality (M-N) in number of said data segments composed of consecutive multi-level symbols used for transmitting data begins with a four-symbol data-segment-synchronizing code.

9. The electromagnetic wave signal of claim 8, wherein said number M has a value equal to 1254 and said number N equals four.

10. The electromagnetic wave signal of claim 8, wherein said number M has a value equal to 1294 and said number N equals four.

11. The electromagnetic wave signal of claim 8, wherein said number M has a value equal to 1295 and said number N equals five.

12. The electromagnetic wave signal of claim 7, wherein said number M has a value equal to 1302 and said number N equals four.

13. The electromagnetic wave signal of claim 7, wherein said number M has a value equal to 1301 and said number N equals five.

14. The electromagnetic wave signal of claim 7, wherein said first ghost-cancellation reference signal is composed of a plurality of PN sequences that are orthogonal to each other and contain equal numbers of symbols.

15. The electromagnetic wave signal of claim 14, wherein said number N has a value at least four, and wherein said first ghost-cancellation reference signal begins before the end of the first data segment of each data frame.

16. The electromagnetic wave signal of claim 14, wherein said number N has a value at least four, and wherein said first ghost-cancellation reference signal begins at the beginning of the second data segment of each data frame.

17. The electromagnetic wave signal of claim 14, wherein said number N has a value at least four, and wherein said first ghost-cancellation reference signal begins a few symbol epochs after the beginning of the second data segment of each data frame.

18. The electromagnetic wave signal of claim 7, wherein a frame start signal is included in the first data segment of each data frame, said first ghost-cancellation reference signal begins after said frame start signal, and said second ghost-cancellation reference signal begins substantially 1368 symbol epochs after said first ghost-cancellation reference signal begins.

19. The electromagnetic wave signal of claim 18, wherein said number N has a value at least four, and wherein said first ghost-cancellation reference signal begins before the end of the first data segment of each data frame.

20. The electromagnetic wave signal of claim 18, wherein said number N has a value at least four, and wherein said first ghost-cancellation reference signal begins at the beginning of the second data segment of each data frame.

21. The electromagnetic wave signal of claim 18, wherein said number N has a value at least four, and wherein said first ghost-cancellation reference signal begins a few symbol epochs after the beginning of the second data segment of each data frame.

22. The electromagnetic wave signal of claim 18, wherein said frame start signal comprises a pseudo-random noise sequence with a baud rate or symbol rate substantially 342 times the horizontal scan line rate of an NTSC television signal.

23. The electromagnetic wave signal of claim 22, wherein said pseudo-random noise sequence with a baud rate or symbol rate substantially 342 times the horizontal scan line rate of an NTSC television signal is succeeded within said frame start signal by a signal corresponding to at least the initial portion of that pseudo-random noise sequence.

24. An electromagnetic wave signal received and processed by a television signal receiver, said signal comprising vestigial sideband modulation of a suppressed carrier in accordance with a baseband signal having a uniform baud rate or symbol rate, said baseband signal composed of consecutive data segments each consisting of a prescribed integral number of symbol epochs, said consecutive data segments being divided into contiguous data frames each consisting of a prescribed integral number M of contiguous ones of said data segments, each said data frame characterized by beginning with a plurality N in number of said data segments used as a data frame header and concluding with a plurality (M-N) in number of said data segments that include consecutive multi-level symbols used for transmitting data, said data frame header in each said data frame including a respective ghost-cancellation reference signal that is composed of a plurality of PN sequences that are orthogonal to each other.

25. The electromagnetic wave signal of claim 24, wherein in each said data frame header said ghost-cancellation reference signal exhibits variation that is complementary to variation exhibited by a preceding other ghost-cancellation reference signal in the same said data frame header.

26. An electromagnetic wave signal received and processed by a television signal receiver, said signal comprising vestigial sideband modulation of a suppressed carrier in accordance with a baseband signal having a uniform symbol rate, said baseband signal composed of consecutive data segments each consisting of a prescribed integral number of symbol epochs, said consecutive data segments being divided into contiguous data frames each consisting of a prescribed integral number M of contiguous ones of said data segments, each said data frame characterized by beginning with a data frame header including a plurality N in number of contiguous ones of said data segments and concluding with a plurality (M-N) in number of said data segments including consecutive multi-level symbols used for transmitting data, said data segments each beginning with a respective data segment synchronization code of a similar prescribed character, said data frame header in each said data frame including a respective ghost-cancellation reference signal that begins in one data segment of said data frame header and finishes in the next-occurring data segment of said data frame header, said respective data segment synchronization code for said next data segment of said data frame header being subsumed in said respective ghost-cancellation reference signal that finishes therein.

27. The electromagnetic wave signal of claim 26, wherein in each said data frame header said ghost-cancellation reference signal exhibits variation that is complementary to variation exhibited by another ghost-cancellation reference signal in the same said data frame header.

28. The electromagnetic wave signal of claim 27, wherein in each said data frame header said ghost-cancellation reference signal begins in a third-occurring data segment of said data frame header, finishes in a fourth-occurring data segment of said data frame header, and exhibits variation that is complementary to variation exhibited by another ghost-cancellation reference signal beginning after said respective data segment synchronization code in a second-occurring data segment of said data frame header.

29. The electromagnetic wave signal of claim 28, wherein in each said data frame header said ghost-cancellation reference signal begins in a third-occurring data segment of said data frame header, finishes in a fourth-occurring data segment of said data frame header, and exhibits variation that is complementary to variation exhibited by another ghost-cancellation reference signal beginning at the outset of a second-occurring data segment of said data frame header, said respective data segment synchronization code for said second data segment of said data frame header being subsumed in said other ghost-cancellation reference signal therewithin.

30. The electromagnetic wave signal of claim 27, wherein in each said data frame header said ghost-cancellation reference signal begins in a third-occurring data segment of said data frame header, finishes in a fourth-occurring data segment of said data frame header, and exhibits variation that is complementary to variation exhibited by another ghost-cancellation reference signal beginning in a first-occurring data segment of said data frame header and finishing in a second-occurring data segment of said data frame header, said respective data segment synchronization code for said second data segment of said data frame header being subsumed in said other ghost-cancellation reference signal.

31. A baseband digital signal received and processed by a television signal receiver, said signal having a uniform symbol rate substantially 684 times the horizontal scan line rate of an NTSC television signal that is apt to accompany said electromagnetic wave signal as a co-channel interfering signal, wherein said baseband signal is composed of consecutive data segments each consisting of a prescribed integral number of symbol epochs, said consecutive data segments being divided into contiguous data frames each consisting of a prescribed integral number M of contiguous ones of said data segments, each said data frame characterized by beginning with a plurality N in number of said data segments used as a data frame header and concluding with a plurality (M-N) in number of said data segments composed of consecutive multi-level symbols used for transmitting data, said data frame header in each said data frame including a first ghost-cancellation reference signal and a second ghost-cancellation reference signal beginning substantially 1368 symbol epochs later than said first ghost-cancellation reference signal, which said first and second ghost-cancellation reference signal exhibit respective variations that are complementary to each other.

32. The baseband digital signal of claim 31, wherein each of said plurality (M-N) in number of said data segments composed of consecutive multi-level symbols used for transmitting data begins with a four-symbol data-segment-synchronizing code.

33. The baseband digital signal of claim 32, wherein said number M equals 1252 and said number N equals four.

34. The baseband digital signal of claim 32, wherein said number M equals 1294 and said number N equals four.

35. The baseband digital signal of claim 32, wherein said number M equals 1295 and said number N equals five.

36. The baseband digital signal of claim 31, wherein said number M equals 1302 and said number N equals four.

37. The baseband digital signal of claim 31, wherein said number M equals 1301 and said number N equals five.

38. The baseband digital signal of claim 31, wherein said first ghost-cancellation reference signal is composed of a plurality of PN sequences that are orthogonal to each other and contain equal numbers of symbols.

39. The baseband digital signal of claim 38, wherein said number N is at least four, and wherein said first ghost-cancellation reference signal begins before the end of the first data segment of each data frame.

40. The baseband digital signal of 38, wherein said number N is at least four, and wherein said first ghost-cancellation reference signal begins at the beginning of the second data segment of each data frame.

41. The baseband digital signal of claim 38, wherein said number N is at least four, and wherein said first ghost-cancellation reference signal begins a few symbol epochs after the beginning of the second data segment of each data frame.

42. The baseband digital signal of claim 31, wherein a frame start signal is included in the first data segment of each data frame, said first ghost-cancellation reference signal begins after said frame start signal, and said second ghost-cancellation reference signal begins substantially 1368 symbol epochs after said first ghost-cancellation reference signal begins.

43. The baseband digital signal of claim 42, wherein said number N is at least four, and wherein said first ghost-cancellation reference signal begins before the end of the first data segment of each data frame.

44. The baseband digital signal of claim 42, wherein said number N is at least four, and wherein said first ghost-cancellation reference signal begins at the beginning of the second data segment of each data frame.

45. The baseband digital signal of claim 42, wherein said number N is at least four, and wherein said first ghost-cancellation reference signal begins a few symbol epochs after the beginning of the second data segment of each data frame.

46. The baseband digital signal of claim 42, wherein said frame start signal comprises a pseudo-random noise sequence with a symbol rate substantially 342 times the horizontal scan line rate of an NTSC television signal.

47. The baseband digital signal of claim 46, wherein said pseudo-random noise sequence with a symbol rate substantially 342 times the horizontal scan line rate of an NTSC television signal is succeeded within said frame start signal by a signal corresponding to at least the initial portion of that pseudo-random noise sequence.

48. A baseband signal received and processed by a television signal receiver, said baseband signal having a uniform symbol rate and being composed of consecutive data segments each consisting of a prescribed integral number of symbol epochs, said consecutive data segments being divided into contiguous data frames each consisting of a prescribed integral number M of contiguous ones of said data segments, each said data frame characterized by beginning with a data frame header including a plurality N in number of contiguous ones of said data segments and concluding with a plurality (M-N) in number of said data segments including consecutive multi-level symbols used for transmitting data, said data frame header in each said data frame including a respective ghost-cancellation reference signal that is composed of a plurality of PN sequences that are orthogonal to each other.

49. The baseband signal of claim 48, wherein in each said data frame header said ghost-cancellation reference signal exhibits variation that is complementary to variation exhibited by a preceding other ghost-cancellation reference signal in the same said data frame header.

50. A baseband signal received and processed by a television signal receiver, said baseband signal having a uniform symbol rate, said baseband signal and being composed of consecutive data segments each consisting of a prescribed integral number of symbol epochs, said consecutive data segments being divided into contiguous data frames each consisting of a prescribed integral number M of contiguous ones of said data segments, each said data frame characterized by beginning with a data frame header including a plurality N in number of contiguous ones of said data segments and concluding with a plurality (M-N) in number of said data segments including consecutive multi-level symbols used for transmitting data, said data segments each beginning with a respective data segment synchronization code of a similar prescribed character, said data frame header in each said data frame including a respective ghost-cancellation reference signal that begins in one data segment of said data frame header and finishes in the next-occurring data segment of said data frame header, said respective data segment synchronization code for said next data segment of said data frame header being subsumed in said respective ghost-cancellation reference signal that finishes therein.

51. The baseband signal of claim 50, wherein in each said data frame header said ghost-cancellation reference signal exhibits variation that is complementary to variation exhibited by another ghost-cancellation reference signal in the same said data frame header.

52. The baseband signal of claim 51, wherein in each said data frame header said ghost-cancellation reference signal begins in a third-occurring data segment of said data frame header, finishes in a fourth-occurring data segment of said data frame header, and exhibits variation that is complementary to variation exhibited by another ghost-cancellation reference signal beginning after said respective data segment synchronization code in a second-occurring data segment of said data frame header.

53. The baseband signal of claim 52, wherein in each said data frame header said ghost-cancellation reference signal begins in a third-occurring data segment of said data frame header, finishes in a fourth-occurring data segment of said data frame header, and exhibits variation that is complementary to variation exhibited by another ghost-cancellation reference signal beginning at the outset of a second-occurring data segment of said data frame header, said respective data segment synchronization code for said second data segment of said data frame header being subsumed in said other ghost-cancellation reference signal therewithin.

54. The baseband signal of claim 51, wherein in each said data frame header said ghost-cancellation reference signal begins in a third-occurring data segment of said data frame header, finishes in a fourth-occurring data segment of said data frame header, and exhibits variation that is complementary to variation exhibited by another ghost-cancellation reference signal beginning in a first-occurring data segment of said data frame header and finishing in a second-occurring data segment of said data frame header, said respective data segment synchronization code for said second data segment of said data frame header being subsumed in said other ghost-cancellation reference signal.

* * * * *

UNITED STATES PATENT AND TRADEMARK OFFICE
CERTIFICATE OF CORRECTION

PATENT NO. : 7,038,732 B1 Page 1 of 1
APPLICATION NO. : 09/700448
DATED : May 2, 2006
INVENTOR(S) : Allen LeRoy Limberg and Chandrakant B. Patel It is certified that error appears in the above-identified patent and that said Letters Patent is hereby corrected as shown below:

Column 22, line 10: delete "in operation" insert --inoperation--

Column 26, line 61: after rate, delete ", said baseband signal"

Signed and Sealed this

Twenty-second Day of August, 2006

JON W. DUDAS
*Director of the United States Patent and Trademark Office*